(12) United States Patent
Lee et al.

(45) Date of Patent: Oct. 6, 2015
(10) Patent No.: US 9,152,244 B2

(54) IMAGE DISPLAY APPARATUS AND METHOD FOR OPERATING THE SAME

(75) Inventors: Minsup Lee, Seoul (KR); Sangrea Woo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 742 days.

(21) Appl. No.: 13/350,664

(22) Filed: Jan. 13, 2012

(65) Prior Publication Data
US 2012/0194427 A1    Aug. 2, 2012

Related U.S. Application Data

(60) Provisional application No. 61/437,661, filed on Jan. 30, 2011.

(51) Int. Cl.
*G06F 3/033* (2013.01)
*G06F 3/038* (2013.01)

(52) U.S. Cl.
CPC ............... *G06F 3/033* (2013.01); *G06F 3/038* (2013.01); *G06F 3/0383* (2013.01)

(58) Field of Classification Search
CPC ....... G06F 3/038; G06F 3/0304; G06F 3/017; G06F 3/0236; G06F 3/0383; G06F 3/0346; G06F 1/1694; G06F 3/033
USPC .......................................... 345/157, 158, 169
See application file for complete search history.

(56) References Cited

U.S. PATENT DOCUMENTS

| 2005/0243061 A1* | 11/2005 | Liberty et al. ................. 345/158 |
| 2009/0153475 A1* | 6/2009 | Kerr et al. ...................... 345/157 |
| 2009/0231296 A1* | 9/2009 | Besshi .......................... 345/173 |
| 2011/0163947 A1* | 7/2011 | Shaw et al. .................... 345/156 |
| 2011/0169734 A1* | 7/2011 | Cho et al. ....................... 345/157 |

* cited by examiner

*Primary Examiner* — Aneeta Yodichkas
(74) *Attorney, Agent, or Firm* — Birch, Stewart, Kolasch & Birch, LLP

(57) ABSTRACT

According to an embodiment of the present invention, a method for operating an image display device using a pointing device includes receiving, from the pointing device, a first signal and a second signal to display a pointer at a particular location on a screen of the image display device, wherein the first signal initiates displaying of the pointer in accordance with a first input selection of the pointing device, determining whether coordinates corresponding to the second signal to display the pointer are outside an active area, wherein the active area is greater than an actual size of the screen, and resetting the coordinates to new coordinates corresponding to a pre-designated area of the screen and displaying the pointer at the pre-designated area of the screen when the coordinates are determined to be outside the active area.

10 Claims, 19 Drawing Sheets

IMAGE DISPLAY APPARATUS AND METHOD FOR OPERATING THE SAME

CROSS-REFERENCE TO RELATED APPLICATION

This application claims benefit of priority of U.S. Provisional Application No. 61/437,661 filed on Jan. 30, 2011 in the USPTO, the disclosure of which is incorporated herein by reference.

BACKGROUND OF THE INVENTION

1. Field of the Invention

The present invention relates to an image display device and a method for operating the same, and more particularly to an image display device, which is able to correct errors and increase user convenience by displaying a pointer at the center of a display screen if the pointer escapes from a virtual active area or a specific pattern is repeated, and a method for operating the same.

2. Description of the Related Art

An image display device functions to display images to a user. A user can view a broadcast program using an image display device. The image display device can display a broadcast program selected by the user on a display from among broadcast programs transmitted from broadcasting stations. The recent trend in broadcasting is a worldwide transition from analog broadcasting to digital broadcasting.

Digital broadcasting transmits digital audio and video signals. Digital broadcasting offers many advantages over analog broadcasting. The advantages include robustness against noise, less data loss, and easier error correction. Also, the digital broadcasting provides clearer and high-definition images. In addition, digital broadcasting allows interactive viewer services which analog broadcasting does not provide.

In order to operate an image display device, a remote control device, such as a remote controller separated from the image display device, is used. With changes in operations performed by the image display device, the remote control device additionally requires various functions to support the changes in operations. Accordingly, more convenient methods for users to control an image display device using a remote control device have been researched.

SUMMARY OF THE INVENTION

Therefore, the present invention has been made in view of the above problems, and it is an object of the present invention to provide an image display device, which is able to correct errors and increase user convenience by displaying a pointer at the center of a display screen if the pointer escapes from a virtual active area or a specific pattern is repeated, and a method for operating the same.

In accordance with an aspect of the present invention, the above and other objects can be accomplished by the provision of a method for operating an image display device using a pointing device, including calculating coordinates of a pointer based on a signal received from the pointing device and displaying the pointer at the center of a display screen if the calculated coordinates are outside a virtual active area including the display screen.

In accordance with another aspect of the present invention, there is provided a method including receiving a signal from a pointing device, checking the trajectory of the received signal, and displaying a pointer at the center of a display screen if the trajectory is repeated.

In accordance with another aspect of the present invention, there is provided an image display device using a pointing device including a display configured to display a pointer on a display screen, an interface configured to calculate coordinates of the pointer based on a signal received from the pointing device, and a controller configured to control the pointer to be displayed at the center of the display screen if the calculated coordinates are outside a virtual active area including the display screen.

In accordance with another aspect of the present invention, there is provided an image display device using a pointing device including a display configured to display a pointer on a display screen, an interface configured to receive a signal from the pointing device, and a controller configured to check the trajectory of the received signal and to display a pointer at the center of a display screen if the trajectory is repeated.

According to an embodiment of the present invention, a method for operating an image display device using a pointing device includes receiving, from the pointing device, a first signal and a second signal to display a pointer at a particular location on a screen of the image display device, wherein the first signal initiates displaying of the pointer in accordance with a first input selection of the pointing device, determining whether coordinates corresponding to the second signal to display the pointer are outside an active area, wherein the active area is greater than an actual size of the screen, and resetting the coordinates to new coordinates corresponding to a pre-designated area of the screen and displaying the pointer at the pre-designated area of the screen when the coordinates are determined to be outside the active area.

According to an embodiment of the present invention, a method for operating an image display device using a pointing device includes receiving, from the pointing device, a signal to display a pointer on a display of the image display device, displaying, on the display, an image, displaying, together with the displayed image, the pointer in a particular area of the display in response to the signal to display the pointer based on at least one of a particular input selection or a particular movement of the pointing device, determining whether a trajectory of the signal indicates that the trajectory is being repeated, and moving the pointer to a pre-designated area of the display to display the pointer at the pre-designated area when the trajectory is determined to be repeated.

According to an embodiment of the present invention, an image display device using a pointing device includes a display configured to display an image and a pointer, an interface configured to receive a signal from the pointing device to display and move the pointer, and a controller configured to control the pointer to be displayed in a particular area of the display based on at least one of a particular input selection or a particular movement of the pointing device, to determine whether a trajectory of the signal indicates that the trajectory is being repeated, and to move the pointer to a pre-designated area of the display to display the pointer at the pre-designated area when the trajectory is determined to be repeated.

According to an embodiment of the present invention, an image display device using a pointing device includes a screen configured to display a pointer, an interface configured to receive a first signal and a second signal to display a pointer at a particular location on the screen, wherein the first signal initiates displaying of the pointer in accordance with a first input selection of the pointing device, and a controller configured to determine whether coordinates corresponding to the second signal to display the pointer are outside an active area, wherein the active area is greater than an actual size of the screen, and the controller further configured to reset the coordinates to new coordinates corresponding to a pre-designated area of the screen and display the pointer at the pre-designated area of the screen when the coordinates are determined to be outside the active area.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Various embodiments of the present invention will be described with reference to the attached drawings.

Figure 1:
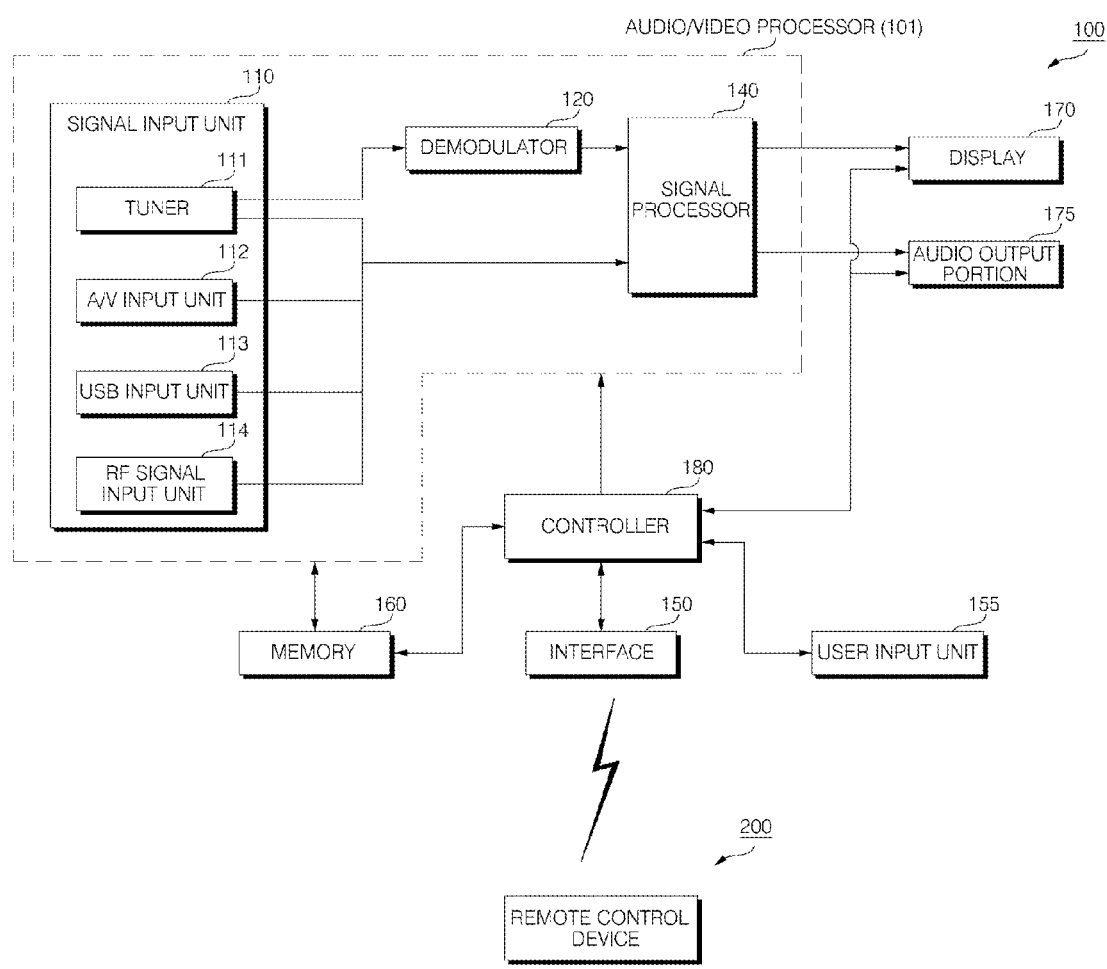
FIG. 1 is a block diagram showing the internal configuration of an image display device according to an embodiment of the present invention.

FIG. 1 is a block diagram showing the internal configuration of an image display device according to an embodiment of the present invention.

Referring to FIG. 1, an image display apparatus 100 includes an audio/video (A/V) processor 101, an interface 150, a memory 160, a display 170, an audio output portion 175 and a controller 180.

The A/V processor 101 processes an input audio or video signal so that an image or voice may be output to the display 170 or the audio output portion 175 of the image display device 100. For the video or audio processing, the A/V processor 101 may include a signal input unit 110, a demodulator 120, and a signal processor 140. The signal input unit 110 may include one or more tuners 111, an A/V input unit/module 112, a Universal Serial Bus (USB) input unit/module 113, and a radio frequency (RF) signal input unit/module 114.

The tuners 111 selects a Radio Frequency (RF) broadcast signal corresponding to a channel selected by a user from among a plurality of RF broadcast signals received through an antenna and downconverts the selected RF broadcast signal into an Intermediate Frequency (IF) signal or a baseband audio or video signal. For example, if the selected RF broadcast signal is a digital broadcast signal, the tuner 111 downconverts the RF broadcast signal to a Digital IF (DIF) signal. If the selected RF broadcast signal is an analog broadcast signal, the tuner 111 downconverts the RF broadcast signal to an analog baseband video or audio signal (Composite Video Banking Sync (CVBS)/Sound Intermediate Frequency (SIF)). That is, the tuner 111 is capable of processing a digital or analog broadcast signal. The analog baseband video or audio signal (CVBS/SIF) output from the tuner 111 may be provided directly to the signal processor 140. The tuner 111 may receive a single-carrier RF broadcast signal based on Advanced Television System Committee (ATSC) or a multi-carrier RF broadcast signal based on Digital Video Broadcasting (DVB).

In accordance with another embodiment of the present invention, the image display device 100 may include at least two tuners. If the image display device 100 includes at least two tuners, a second tuner also selects an RF broadcast signal of a user-selected channel from among RF broadcast signals received through the antenna and downconverts the selected RF broadcast signal to an IF signal or a baseband video or audio signal. Also, the second tuner may sequentially select RF signals of all broadcast channels that have been stored by a channel memory function and downconvert the selected RF signals to IF signals or baseband video or audio signals. Here, the second tuner may perform downconversion of the RF signals of all broadcast channels periodically.

Hence, the image display device 100 may provide video signals of a plurality of channels downconverted by the second tuner as thumbnail images, while displaying the video of a broadcast signal downconverted by the first tuner. In this case, the first tuner may downconvert a user-selected main RF broadcast signal to an IF signal or a baseband video or audio signal, and the second tuner may sequentially/periodically select all RF broadcast signals except for the main RF broadcast signal and downconvert the selected RF broadcast signals to IF signals or baseband video or audio signals.

The demodulator 120 demodulates the DIF signal received from the tuner 111. For example, if the DIF signal output from the tuner 111 is an ATSC signal, the demodulator 120 demodulates the DIF signal by 8-Vestigal Side Band (8-VSB). In another example, if the DIF signal output from the tuner 111 is a DVB signal, the demodulator 120 demodulates the DIF signal by Coded Orthogonal Frequency Division Multiple Access (COFDMA) demodulation.

Further, the demodulator 120 may perform a channel decoding. For the channel decoding, the demodulator 120 may include a Trellis decoder, a deinterleaver, and a Reed Solomon decoder, for Trellis decoding, deinterleaving and Reed Solomon decoding, respectively.

After the demodulation and channel decoding, the demodulator 120 may output a Transport Stream (TS) signal. A video signal, an audio signal, or a data signal may be multiplexed in the TS signal. For example, the TS signal may be a Moving Picture Experts Group-2 (MPEG-2) TS that includes a multiplexed MPEG-2 video signal and a Dolby AC-3 audio signal. Specifically, the MPEG-2 TS may include a 4-byte header and 184-byte payload. Thereafter the TS signal output from the demodulator 120 may be provided to the signal processor 140. The signal processor 140 demultiplexes and processes the TS signal and outputs a video signal to the display 170 and an audio signal to the audio output portion 175. An image display device having at least two tuners may have two demodulators. Preferably, a number of demodulators corresponds to a number of tuners, for example. Also, a demodulator may be separately provided for ATSC and DVB.

The signal input unit 110 may connect the image display device 100 to an external device. Here, the external device can be a digital versatile disc (DVD) player, a Blu-ray player, a game player, a camcorder, a computer (laptop computer), etc. The signal input unit 110 sends an external input video signal, an external input audio signal and an external input data signal to the signal processor 140 of the image display device 100. The signal input unit 110 also outputs an audio, video or data signal processed in the image display device 100 to another external device.

In the signal input unit 110, the A/V input module 112 may include a composite video banking sync (CVBS) port, a component port, an S-video port (analog), a Digital Visual Interface (DVI) port, a High Definition Multimedia Interface (HDMI) port, a Red, Green, Blue (RGB) port, a D-SUB port, an Institute of Electrical and Electronics Engineers (IEEE) 1394 port, a Sony/Phillips Digital InterFace (SPDIF) port, a Liquid HD port, etc. in order to provide audio and video signals received from the external device to the image display device 100. Then, analog signals received through the CVBS port and the S-video port may be provided to the signal processor 140 after analog-to-digital conversion and digital signals received through the other input ports may be provided to the signal processor 140 without analog-to-digital conversion.

The USB input module 113 may receive audio and video signals through the USB port.

The RF signal input module 114 may connect the image display device 100 to a wireless network. The image display device 100 may access the wireless Internet or other network through the RF signal input module 114. To connect to the wireless Internet, a communication standard, such as Wireless Local Area Network (WLAN) (Wi-Fi), Wireless Broadband (WiBro), Worldwide Interoperability for Microwave Access (Wimax), High Speed Downlink Packet Access (HSDPA), etc. may be used. Further, the RF signal input module 114 may conduct short-range communications with another electronic device. For example, the RF signal input module 114 may be networked to another electronic device by a communication standard like a Bluetooth, a Radio Frequency Identification (RFID), an InfraRed Data Association (IrDA), an Ultra Wideband (UWB), a ZigBee, etc.

The signal input unit 110 may connect the image display device 100 and a set-top box. For instance, if the set-top box is Internet Protocol (IP) TV capable, the signal input unit 110 may transmit an audio, video or data signal received from the IPTV set-top box to the signal processor 140 and a processed signal received from the signal processor 140 to the IP TV set-top box.

The term 'IPTV' as used herein covers a broad range of services, depending on transmission networks, such as Asynchronous Digital Subscriber Line-TV (ADSL-TV), Very high data rate Digital Subscriber Line-TV (VDSL-TV), Fiber To The Home-TV (FTTH-TV), TV over DSL, Video over DSL, TV over IP (TVIP), Broadband TV (BTV), and Internet TV and full-browsing TV which are capable of providing Internet access services.

The signal processor 140 may demultiplex a received TS signal including an MPEG-2 TS into an audio signal, a video signal and a data signal. The signal processor 140 may also process the demultiplexed video signal. For instance, if the demultiplexed video signal was coded, the signal processor 140 may decode the coded video signal. More specifically, if the demultiplexed video signal is an MPEG-2 coded video signal, an MPEG-2 decoder may decode the demultiplexed video signal. If the demultiplexed video signal was coded in compliance with H.264 for Digital Multimedia Broadcasting (DMB) or Digital Video Broadcasting-Handheld (DVB-H), an H.264 decoder may decode the demultiplexed video signal.

Also, the signal processor 140 may control a brightness, a tint, and a color for the video signal. The video signal processed by the signal processor 140 is displayed on the display 170 (the signal processor 140 may also process the demultiplexed audio signal).

For example, if the demultiplexed audio signal was coded, the signal processor 140 may decode the audio signal. More specifically, if the demultiplexed audio signal is an MPEG-2 coded audio signal, an MPEG-2 decoder may decode the demultiplexed audio signal. If the demultiplexed audio signal was coded in compliance with MPEG 4 Bit Sliced Arithmetic Coding (BSAC) for terrestrial DMB, an MPEG 4 decoder may decode the demultiplexed audio signal. If the demultiplexed audio signal was coded in compliance with MPEG 2 Advanced Audio Codec (AAC) for satellite DMB or DVB-H, an AAC decoder may decode the demultiplexed audio signal. Further, the signal processor 140 may control a bass, a treble, and a volume of the audio signal. Thereafter, the audio signal processed by the signal processor 140 is provided to the audio output portion 175.

Also, the signal processor 140 may process the demultiplexed data signal. For example, if the demultiplexed data signal was coded, the signal processor 140 may decode the data signal. The coded data signal may be Electronic Program Guide (EPG) information including broadcasting information such as the starts, ends, etc. of broadcast programs of each channel. For instance, the EPG information may be ATSC-Program and System Information Protocol (ATSC-PSIP) information in case of ATSC. In case of DVB, the EPG information may include DVB-Service Information (DVB-SI). The ATSC-PSIP information or DVB-SI may be included in the 4-byte header of the afore-described TS, i.e. MPEG-2 TS.

In addition, the signal processor 140 may perform an On-Screen Display (OSD) function. Specifically, the signal processor 140 may display graphic or text information on the display 170 based on at least one of the processed video and data signals and a user input signal received through a remote control device 200.

Referring to FIG. 1, the memory 160 may store programs for signal processing and control operations of the controller 180, and store processed video, audio or data signals. Also, the memory 160 may temporarily store video, audio or data signals received through the signal input unit 110. The memory 160 may include a storage medium of at least one type of flash memory, hard disk, multimedia card micro type, card-type memory (e.g. Secure Digital (SD) or eXtreme Digital (XD) memory), an optical disk, a removable storage such as a memory stick, Random Access Memory (RAM), and Read Only Memory (ROM) (e.g. Electrically Erasable Programmable ROM (EEPROM)). When a user selects a file to be reproduced, the image display device 100 may reproduce a file stored in the memory 160 (e.g. a moving image file, a still image file, a music file, a text file, etc.) and provide the file to the user.

The controller 180 provides overall control to the image display device 100. The controller 180 may receive a signal from the remote control device 200 via the interface 150. When the user inputs a command input to the remote controller 200, the controller 180 identifies the command input using the received signal and controls the image display device 100 according to the command input. For example, upon receiving a predetermined channel selection command from the user, the controller 180 controls the tuner 111 to provide a selected channel through the signal input unit 110, the signal processor 140 to process the audio and video signals for the selected channel, and the signal processor 140 to output user-selected channel information along with the processed audio and video signals to the display 170 or the audio output portion 175.

Further, the user may enter a different-type video or audio output command through the remote control device 200. For example, if the user wants to view an image from a camera or a camcorder received through the USB input module 113, instead of a broadcast signal, the controller 180 may control the A/V processor 101 and the signal processor 140 to process an audio or video signal received through the USB input module 113 of the signal receiver 110. Then, the controller 180 may output the processed audio and/or video signal to the display 170 and/or the audio output portion 175.

In addition to commands received through the remote control device 200, the controller 180 may also identify a user command received through the user input unit 155 provided to the image display device 100 and control the image display device 100 according to the user command. For example, the user may input other commands such as an on/off command, a channel switch command, a volume change command, or the like to the image display device 100 through the user input unit 155. The user input unit 155 may include buttons or keys formed on the image display device 100 or may be a keyboard a touch screen, a key pad, a stylus, a mouse, etc. The controller 180 determines whether the user input unit 155 has been manipulated and controls the image display device 100 according to the determination result. The image display device 100 can be, e.g., a digital TV, a smart TV, a computer, a notebook, a portable multimedia device, a mobile terminal such as a smart phone, a navigation device, etc.

Figure 2A:
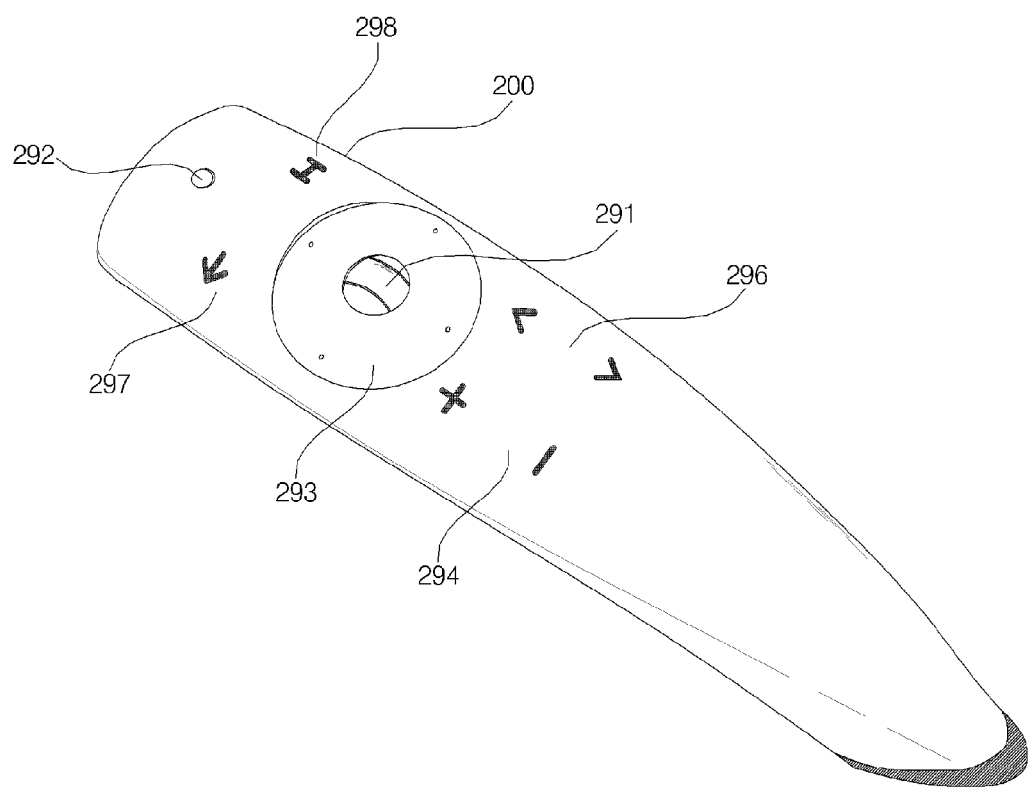
FIGS. 2A to 2C are perspective views of an image display device and a pointing device able to input a command to the image display device according to an embodiment of the present invention.
Figure 2B:
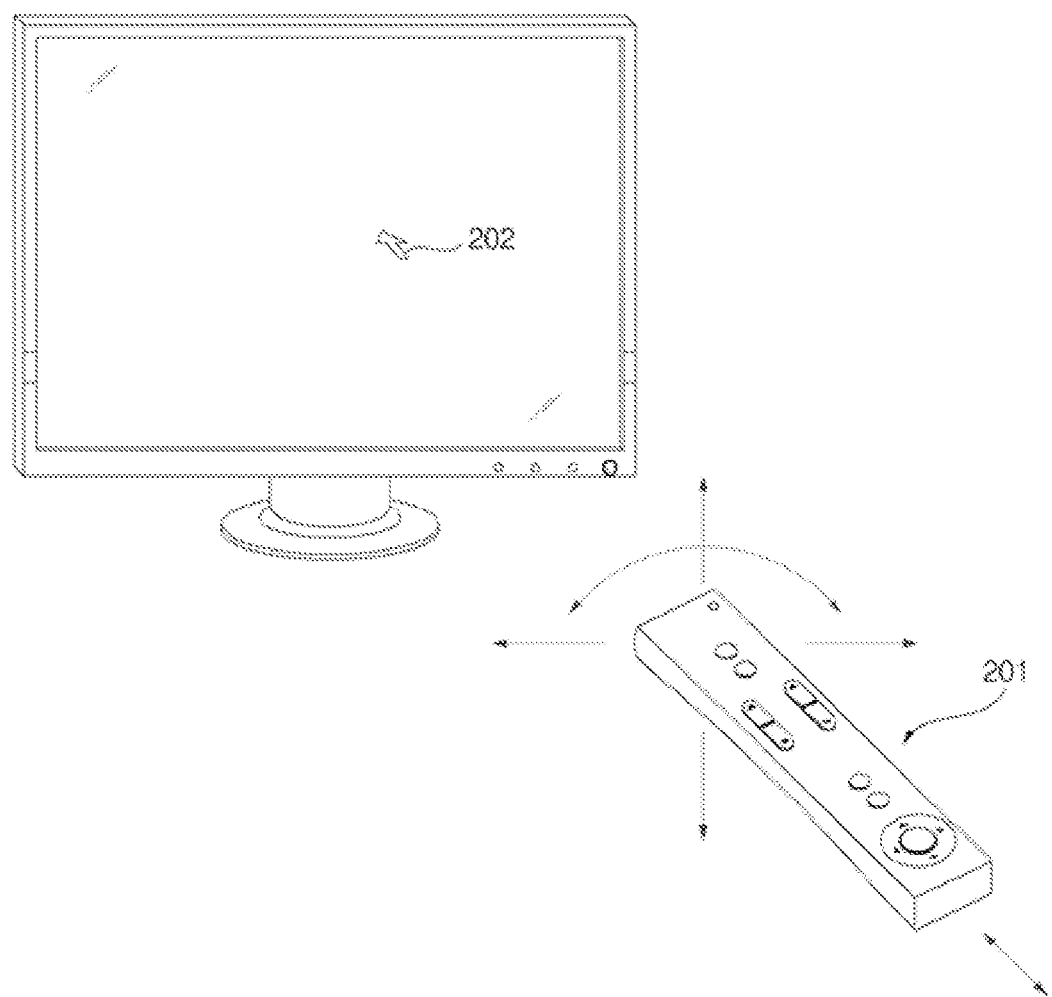
Figure 2C:
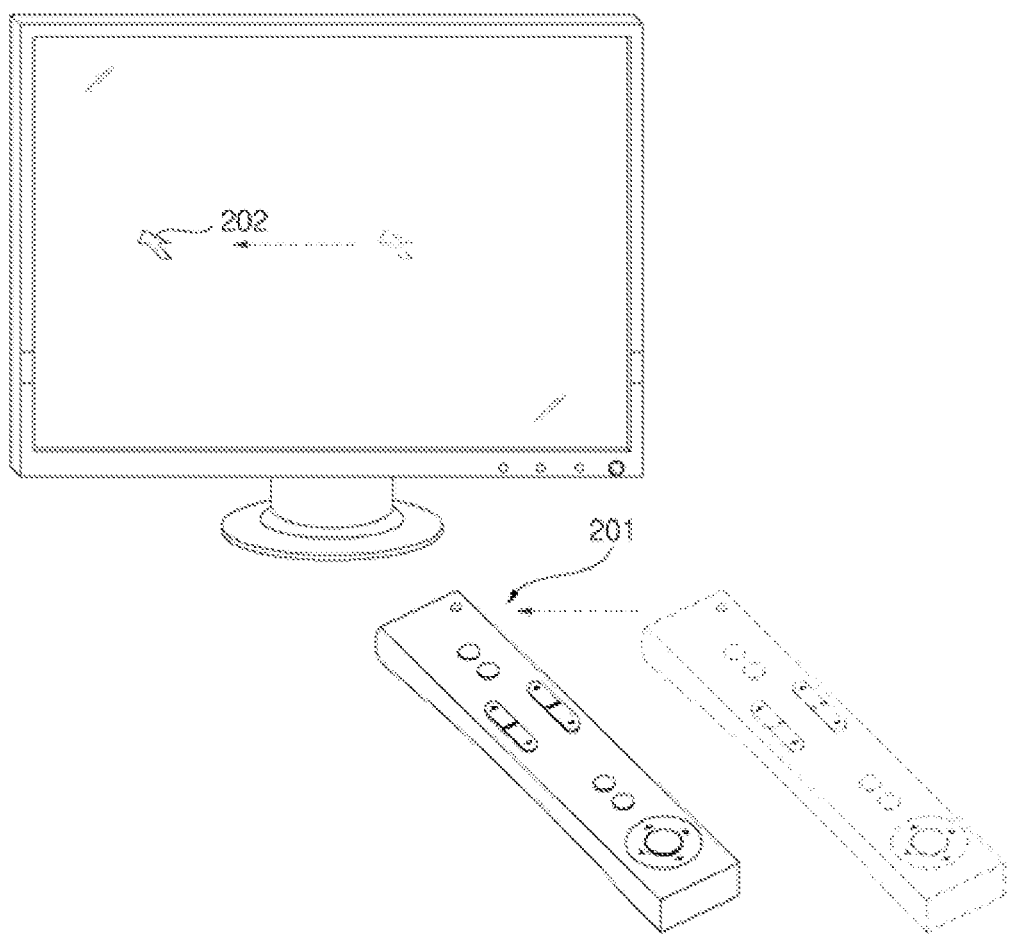

FIGS. 2A to 2C are perspective views of an example of an image display device 100 and a pointing device 201 is able to input a command to the image display device according to an embodiment of the present invention.

The pointing device 201 is an example of the remote control device 200 for entering a command for the image display device 100. In accordance with the embodiment of the present invention, the pointing device 201 transmits and receives signals to and from the image display device 100 in compliance with an RF communication standard.

FIG. 2A shows an example of the pointing device 201 according to an embodiment of the present invention. Referring to FIG. 2A, the pointing device 201 according to the embodiment of the present invention may include various input keys, input buttons, etc. For example, the pointing device 201 may include an okay/enter/select key 291, a menu key 292, a 4-direction key 293, a channel control key 294, and a volume control key 296.

For example, the okay/enter/select key 291 may be used to select a menu or item, the menu key 292 may be used to display a predetermined menu, the 4-direction key 294 may be used to move a pointer or indicator up, down, left and right, the channel control key 294 may be used to move a channel up or down, and the volume control key 296 may be used for volume control. The pointing device 201 may further include a back key 297 and a home key 298. For example, the back key 297 may be used to move a screen to a previous screen and the home key 298 may be used to move a screen to a home screen.

As shown in FIG. 2A, the okay/enter/select key 291 may further include a scroll function. For the scroll function, the okay/enter/select key 291 may be implemented as a wheel key. That is, by pushing the okay/enter/select key 291, a menu or item is selected. When the okay key 291 is scrolled up or down, a display screen is scrolled or a list page is switched in accordance with the scrolled action of the okay/enter/select key 291.

More specifically, for example, when an image having a size greater than the size of the display is displayed on the display 170, the user may scroll the okay/enter/select key 291 to view and to display an image region of the image which is not currently displayed on the display. Further, a list page is displayed on the display 170, the user may scroll the okay/enter/select key 291 to view and display a previous page or a next page of a current page. Such a scroll function may be included separately from the okay key 291.

Referring to FIG. 2A, four-direction key 293 may include up, down, left and right keys in a circular shape. Further, the four-direction key 293 may be configured to receive a touch input. For example, if a touch operation from the up key to the down key in the four-direction key 293 is performed, a predetermined function may be input or performed according to the touch input.

As shown in FIG. 2B, a pointer 202 corresponding to another example of the pointing device 201 may be displayed on a screen of the image display device 100. When the user moves the pointing device 201 up, down, left, right, forward or backward, or rotates it, the pointer 202 may be moved on the image display device 100 in correspondence with the movement of the pointing device 201.

FIG. 2C illustrates a movement of the pointer 202 on the screen of the image display device 100 according to a movement of the pointing device 201. Referring to FIG. 2C, when the user moves the pointing device 201 to the left, the pointer 202 also moves to the left on the image display device 100. In accordance with the embodiment of the present invention, the pointing device 201 includes a sensor for sensing the movement of the pointing device 201. Thus, information about the movement of the pointing device 201 sensed by the sensor is provided to the image display device 100. Then, the image display device 100 determines the movement of the pointing device 201 based on the information about the movement of the pointing device 201 and calculates the coordinates of the pointer 202 corresponding to the movement of the pointing device 201.

Here, the pointer 202 displayed on the display 170 moves in correspondence with an upward, downward, left or right movement or rotation of the pointing device 201. The velocity or direction of the pointer 202 may correspond to that of the pointing device 201. In accordance with the embodiment of the present invention, the pointer is set to move on the image display device 100 in correspondence with the movement of the pointing device 201. It can be further contemplated as another embodiment of the present invention that a particular movement of the pointing device 201 triggers a predetermined command to the image display device 100. For example, if the pointing device 201 moves forward or backward, an image displayed on the image display device 200 may be enlarged or contracted. Therefore, the embodiment of the present invention does not limit the scope of the present invention.

Figure 3:
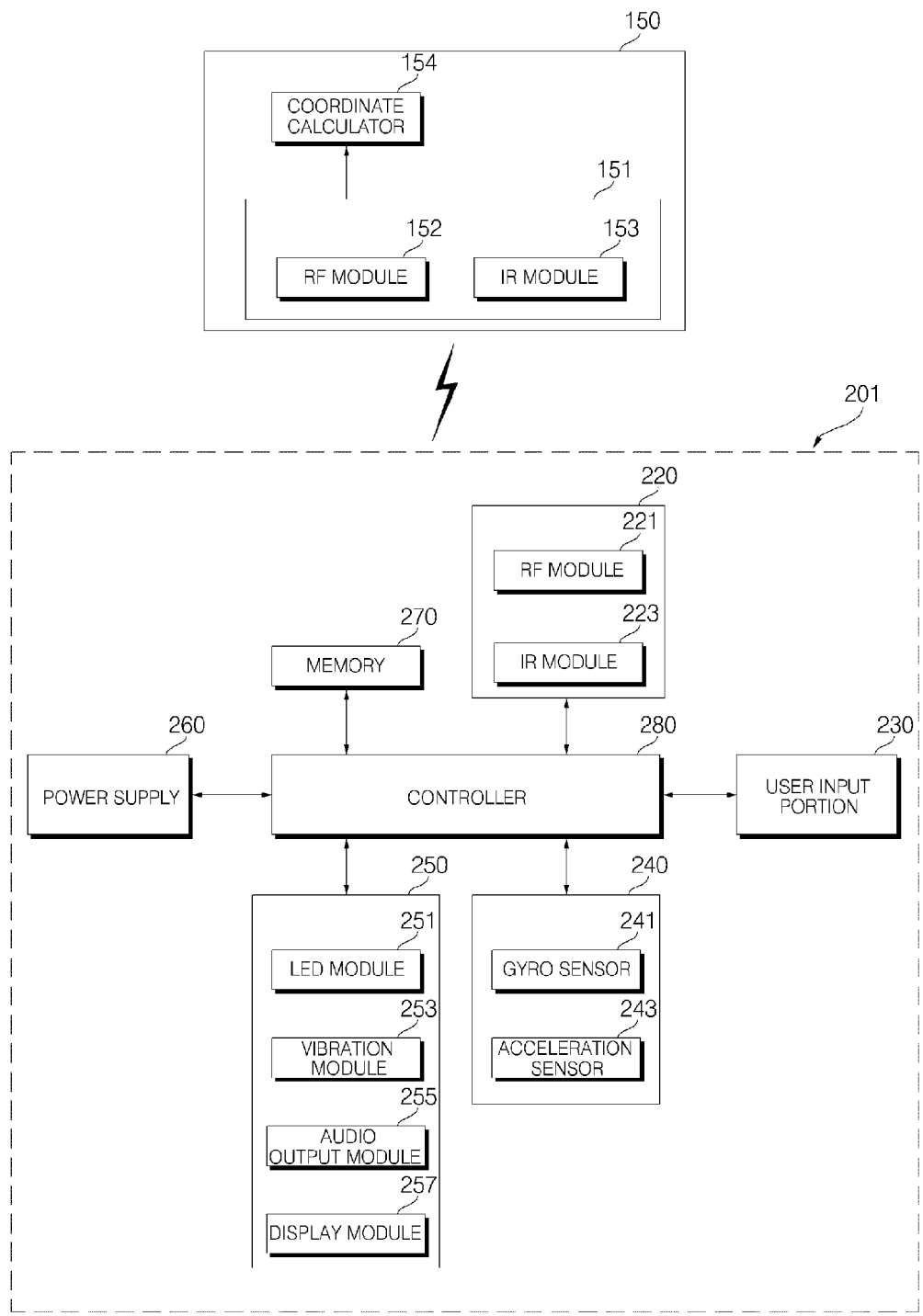
FIG. 3 is a block diagram showing the internal configuration of a pointing device and an interface of an image display device according to an embodiment of the present invention.

FIG. 3 is a block diagram of an example of the pointing device 201 and the interface 150 of the image display device 100 according to an exemplary embodiment of the present invention. The pointing device 201 is an example of the remote control device 200.

Referring to FIG. 3, the pointing device 201 may include a radio transceiver 220, a user input portion 230, a sensor portion 240, an output portion 250, a power supply 260, a memory 270, and a controller 280, all operably coupled.

The radio transceiver 220 transmits and receives signals to and from the image display device 100. In accordance with the embodiment of the present invention, the pointing device 201 may be provided with an RF module 221 for transmitting and receiving signals to and from the interface 150 of the image display device 100 according to an RF communication standard. Also, the pointing device 201 may include an IR module 223 for transmitting and receiving signals to and from the interface 150 of the image display device 100 according to an IR communication standard.

In accordance with the embodiment of the present invention, the pointing device 201 transmits signal carrying information about an operation of the pointing device 201 to the image display device 100 through the RF module 221. Also, the pointing device 201 may receive a signal from the image display device 100 through the RF module 221. Thus, the pointing device 201 may transmit commands associated with a power on/off, a channel switching, a volume change, etc. to the image display device 100 through the IF module 223.

Also, the user input portion 230 may include a keypad or buttons. The user may enter a command to the pointing device 201 by manipulating the user input portion 230 to an operation to be performed on the image display device 100. For example, if the user input portion 230 includes hard keys, the user may push the hard keys of the pointing device 201 for commands to be performed on the image display device 100. Furthermore, if the user input portion 230 is provided with a touch screen, the user may touch soft keys on the touch screen of the pointing device 201 for commands to be performed on the image display device 100. Also, the user input portion 230 may have a variety of input means which may be manipulated by the user, such as a scroll key, a jog key, etc., to which the present invention is not limited.

The sensor portion 240 may include at least one of a gyro sensor 241 and an acceleration sensor 243. The gyro sensor 241 may sense an operation of the pointing device 201. For example, the gyro sensor 241 may detect the directional information about an operation of the pointing device 201 along x, y and z axes. The acceleration sensor 243 may detect velocity information of the pointing device 201.

In accordance with the embodiment of the present invention, in the sensor portion 240, the gyro sensor 241 and the acceleration sensor 243 may be replaced with other sensors or other sensors may be included in addition to the gyro sensor 241 and the acceleration sensor 243, in order to detect positional and moving data and information associated with the pointing device 201. For example, the sensor portion 240 may include a geomagnetic sensor. In the geomagnetic sensor, three sensors for measuring a strength of a magnetic field are provided along X, Y and Z axes, and the direction of the magnetic field influencing the sensors may be measured by a sum of output vectors of the three sensors. Therefore, the movement of the pointing device 201 can be sensed based on a change in a magnetic field.

Referring to FIGS. 2A-2C, the output portion 250 may output a video or audio signal corresponding to a manipulation of the user input portion 230 or a signal transmitted by the image display device 100. The user may be aware from the output portion 250 whether the user input portion 230 has been manipulated or the image display device 100 has been controlled. For example, the output portion 250 may include a Light Emitting Diode (LED) module 251. The output portion 250 is illuminated when the user input portion 230 has been manipulated or a signal is transmitted to or received from the image display device 100 through the radio transceiver 220, a vibration module 253 for generating vibrations, an audio output module 255 for outputting audio, and/or a display module 257 for outputting video.

The power supply 260 supplies the power to the pointing device 201. When the pointing device 201 is kept stationary for a predetermined time, the power supply 260 blocks the power from the pointing device 201. When a predetermined key of the pointing device 201 is manipulated, the power supply 260 may resume a power supply.

The memory 270 may store a plurality of types of programs required for controlling or operating the pointing device 201, or application data. When the pointing device 201 transmits and receives signals to and from the image display device 100 wirelessly through the RF module 221, the pointing device 201 and the image display device 100 perform signal transmission and a signal reception in a predetermined frequency band. The controller 280 of the pointing device 201 may store information about the frequency band to wirelessly transmit and receive signals to and from the image display device 100 paired with the pointing device 201 in the memory 270, and the controller 280 may refer to the information.

The controller 280 provides an overall control to the pointing device 201. The controller 280 may transmit a signal corresponding to a predetermined key manipulation on the user input portion 230 or a signal corresponding to an operation of the pointing device 201 detected by the sensor portion 240 to the interface 150 of the image display device 100 through the radio transceiver 220.

Here, the interface 150 of the image display device 100 may include a radio transceiver 151 for wirelessly transmitting and receiving signals to and from the pointing device 201, and a coordinate calculator 154 for calculating the coordinates of the pointer corresponding to an operation of the pointing device 201. Further, the interface 150 may transmit and receive signals wirelessly to and from the pointing device 201 through the RF module 152. The interface 150 may also receive a signal from the pointing device 201 through the IR module 153 based on the IR communication standard.

The coordinate calculator 154 may calculate the coordinates (x, y) of the pointer 202 to be displayed on the display 170 by correcting a handshaking or errors from a signal corresponding to an operation of the pointing device 201 received through the radio transceiver 151.

Thereafter, a signal received from the pointing device 201 through the interface 150 is provided to the controller 180 of the image display device 100. The controller 180 may identify information about an operation of the pointing device 201 or a key manipulation on the pointing device 201 from the signal received from the pointing device 201 and control the image display device 100 according to the identical information.

In another example, the pointing device 201 may calculate the coordinates of the pointer corresponding to the operation of the pointing device and output the coordinates to the interface 150 of the image display device 100. The interface 150 of the image display device 100 may then transmit the received coordinate information to the controller 180 without correcting a handshaking or errors.

FIGS. 1-3 illustrate the image display device 100 and the pointing device 201 as the remote control device 200 according to an embodiment of the present invention. The components of the image display device 100 and the pointing device 201 may be integrated or omitted, or a new component may be added. That is, when needed, two or more components may be incorporated into a single component or one component may be configured to be divided into two or more separate components. Also, the function of each block is presented for illustrative purposes, not limiting the scope of the present invention.

Figure 4:
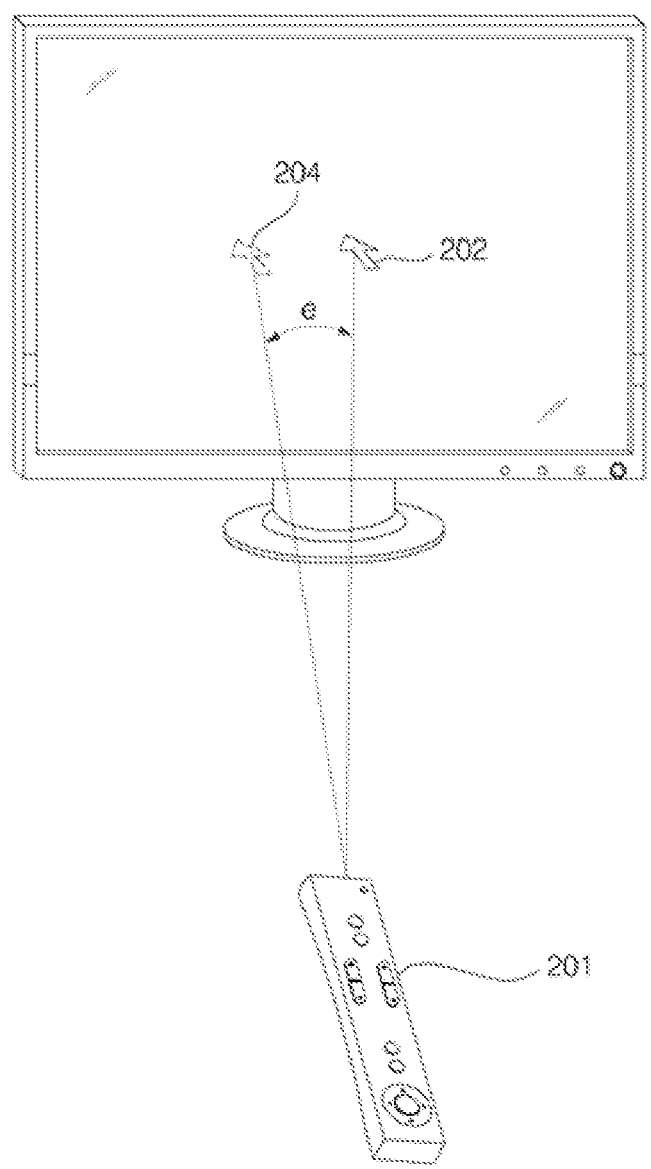
FIG. 4 is a view referred to for describing a method for operating an image display device according to an embodiment of the present invention.

FIG. 4 is a view referred to for describing a method for operating an image display device according to an embodiment of the present invention.

If the pointing device 201 is used for a predetermined period of time as shown in FIG. 4, an error e may occur between the current position of the pointing device 201 or the position 204 of the pointer desired by the user and the current position 202 of the pointer on the display screen of the device 100.

Horizontal and vertical movements of the pointer on the display screen are calculated using the signal received from the pointing device, and new coordinates of the pointer are calculated by adding the calculated movements to the previous position of the pointer. Then, the pointer is displayed on the display screen based on the calculated new coordinates.

Errors may occur due to sensor errors of a gyro sensor and/or an acceleration sensor. Integral errors due to sensor errors occur when the pointing device 201 is actually moved by a certain distance, a movement method, and variation in sensor output value such as velocity. Since the above errors are accumulated, an error 'e' may occur between the position of the pointing device 201 or a pointing area of the pointing device 201 and the position of the pointer 202.

If the pointing device 201 crosses an edge of the display screen, that is, an edge of the screen of the image display device 100, a positional error may also occur. In this case, the pointer 202 may move in the display screen but may not move to the outside of the screen. For example, if the pointer is located at the edge of the screen of the image display device 100, the position of the pointer is kept stationary even when the pointing device 201 moves to the outside of the screen of the image display device 100. Accordingly, an error may occur between the position of the pointer and the pointing position of the pointing device 201. If the pointing device 201 moves in the opposite direction, that is, to the center of the screen in this state, the pointer is moved and displayed but an error between the position of the pointer 202 and the pointing position of the pointing device 201 may be maintained. Accordingly, if the pointing device 201 repeatedly crosses the edge of the display screen, such a positional error may be accumulated and further increased.

Figure 5:
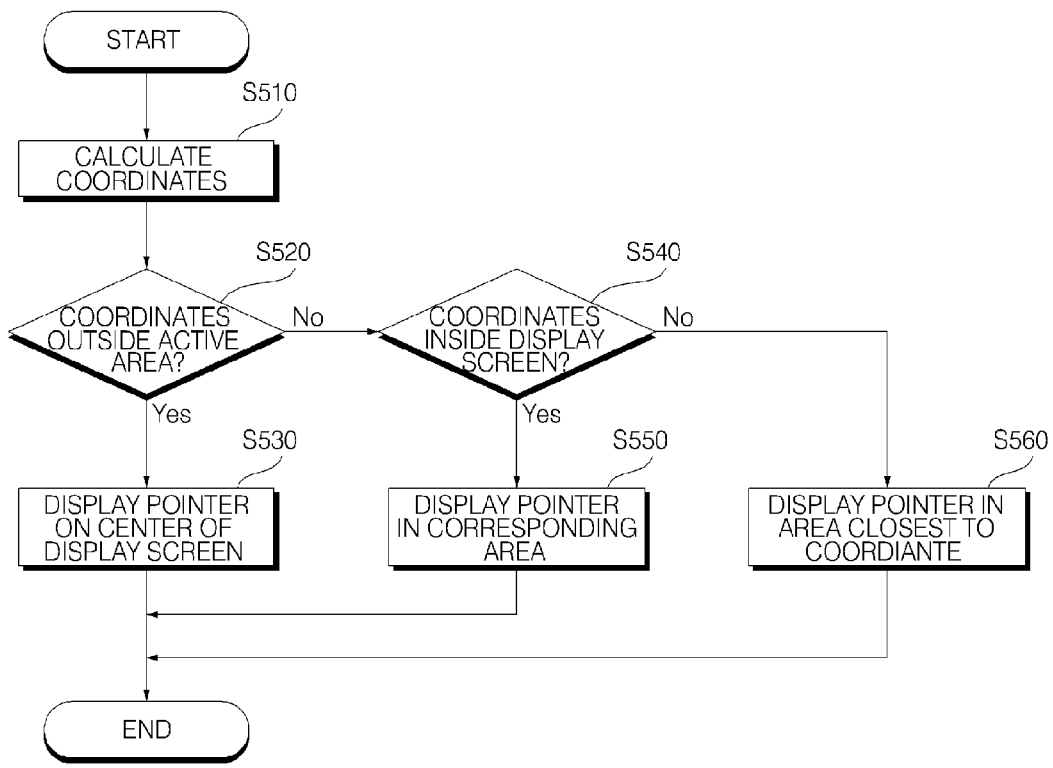
FIG. 5 is a flowchart illustrating a method for operating an image display device according to an embodiment of the present invention.
Figure 6:
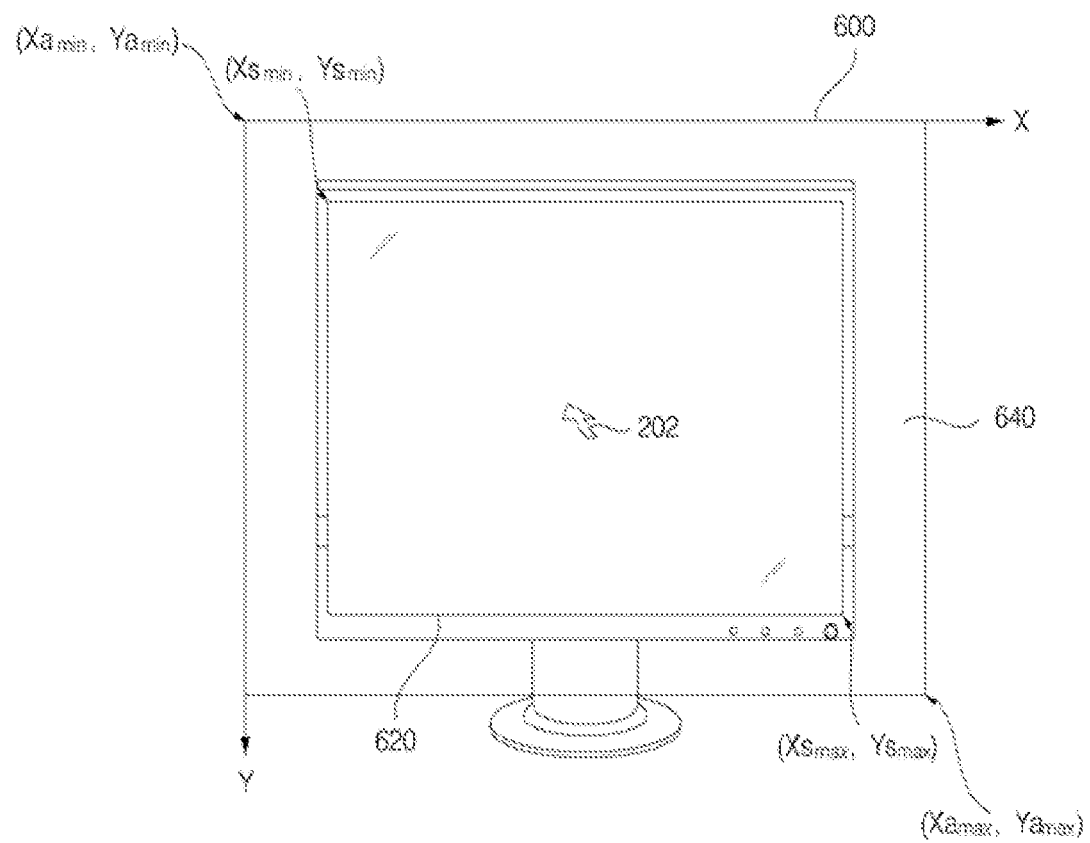
FIG. 6 is a view referred to for describing an example of the method of FIG. 5.

FIG. 5 is a flowchart illustrating a method for operating an image display device according to an embodiment of the present invention, and FIG. 6 is a view referred to for describing the method of FIG. 5.

Referring to FIGS. 5 and 6, the interface 150 calculates coordinates on the screen of the display 170 based on the signal received from the pointing device (S510). The controller 180 determines in which are the calculated coordinates are included and displays the pointer at a position corresponding to the area.

First, it is determined whether the calculated coordinates are outside a virtual active area of the display screen of the device 100 (S520). Referring to FIG. 6, an active area 600 is set to include the display screen 620 and the size of the active area 600 is greater than that of the display screen 620 of the device 100. FIG. 6 shows maximum and minimum values of the active area 600 and the display screen 620. More preferably, the centers and aspect ratios of the active area 600 and the display screen 620 are the same or substantially the same. In other words, although the active area 600 is greater than the display screen 620, the active area 600 is directly proportional to the display screen 620 in terms of size.

If the calculated coordinates are outside the active area 600, the controller 180 displays the pointer 202 at the center or center area of the display screen 620 (S530). The active area 600 is greater than the display screen 620 as described above. Therefore, although the pointer 202 may not be displayed outside the display screen, the pointing device 201 may be continuously moved if the pointing device 201 may operate outside the active area 600. If the pointing device 201 is continuously moved to become distant from the display screen, an association between the movement of the pointer and the operation of the pointing device is reduced and thus an accurate operation may not be performed. For example, if the user operates the pointing device 201 at the same point, as the pointing position of the pointing device 201 is distant from the center of the display screen, the movement of the pointer 202 on the display screen of the image display device may be greater than the movement of the pointing device 201.

Accordingly, in the method for operating the image display device according to the embodiment of the present invention, if the calculated coordinates are outside the active area 600, the pointer 202 may be forcibly displayed at the center of the display screen 620, a signal may be received from the pointing device 201, and an operation corresponding to the received signal may be performed. Since the pointer 202 is displayed at the center of the display screen, the user may readily check the position of the pointer 202. In this instance, since the pointing device 201 may be still used when being disposed at the center of the display screen, a positional error can be corrected.

The controller 180 may reset the calculated coordinates to the coordinates corresponding to the center of the display screen 620 and display the pointer at the center of the display screen 620 based on the reset coordinates. In addition to the display position of the pointer 202, reference coordinates may be reset even in the subsequent movement of the pointer in the image display device so as to be used for coordinate calculation.

The controller 180 may keep the pointer in an inactive state for a predetermined period of time, after the pointer 202 is displayed at the center of the display screen. That is, after the pointer 202 is displayed at the center of the display screen 620, even when the user moves the pointing device 201 within a predetermined period of time, the pointer is not moved for the predetermined period of time, in order to ensure a time for enabling the user to rearrange the pointing device 201 at the center of the display screen. When a predetermined time has elapsed or if the user moves the pointing device 201 to the position of the pointer and then pushes a particular button or moves the pointing device 201 in a specific pattern, the pointer may be switched from the inactive state to the active state.

Referring to FIG. 5, when the calculated coordinates are inside the active area (S520, No) the controller 180 determines whether the calculated coordinates are inside the display screen 620 (S540). If the calculated coordinates are inside the display screen 620, the controller 180 displays the pointer 202 in an area corresponding to the calculated coordinates (S550).

Here, when the pointer is displayed in the area corresponding to the calculated coordinates on the display screen 620, it is unlikely that an error will occur in the movement of the pointer in the display screen 620.

If the calculated coordinates are between the edge of the active area and the display screen 620, that is, the area 640 excluding the display screen of the active area 600 (S540, No), the controller 180 displays the pointer 202 in an area closest to the calculated coordinates on the display screen 620

(S540, No) (S560). Therefore, although virtual pointer coordinates may move in the active area, the display coordinates of the pointer may be fixed and displayed at the edge of the display screen. The method of calculating coordinates in the display screen and the method of calculating coordinates in the area excluding the display screen in the active area may be the same.

In an example, the coordinates calculated according to the operation of the pointing device are movement coordinates and the coordinates of the pointer to be displayed on the display screen are display coordinates. When the movement coordinates of the pointer are continuously changed in the active area, the display coordinates are coordinates at which a pointer icon is actually displayed, equal to the movement coordinates on the display screen, and the display coordinates are limited in each of directions X and Y if they escape from the display screen. For instance, referring to FIG. 6, if the virtual pointer moves to the outside of the left edge of the display screen but within the active area, the X coordinate of the display coordinates is fixed to $X_{Smin}$, which is the edge of the display screen in the X coordinate, and the pointer is displayed at the left edge of the display screen. The same is true in up, down and right directions. However, if the pointer moves to the outside of the active area, the position of the pointer may be forcibly set to the center of the display screen and the pointer is changed to the inactive state. This coordinate calculation method may be used in a relative coordinate method of adding the movement of the pointer to the existing coordinates in the active area and an absolute coordinate method of applying the movement of the pointer.

Figure 7:
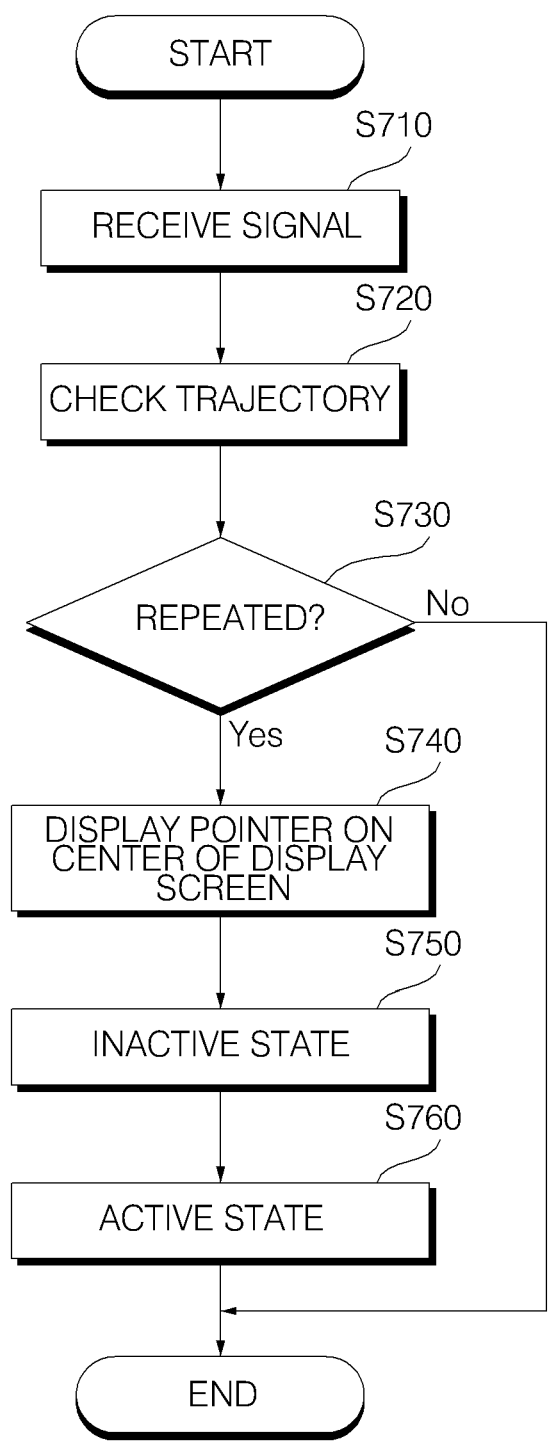
FIG. 7 is a flowchart illustrating a method for operating an image display device according to an embodiment of the present invention.
Figure 8:
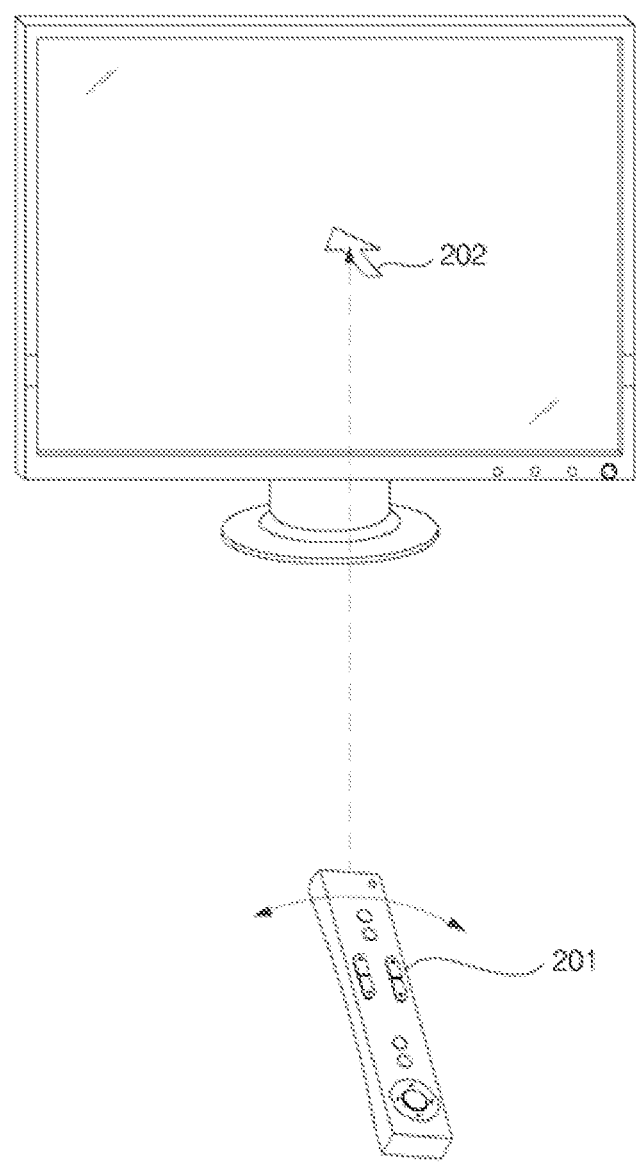
FIG. 8 is a view referred to for describing an example of the method of FIG. 7.

FIG. 7 is a flowchart illustrating a method for operating an image display device according to an embodiment of the present invention, and FIG. 8 is a view referred to for describing the method of FIG. 7.

Referring to FIGS. 7 and 8, first, a signal is received from the pointing device 201 through the interface 150 of the device 100 (S710). The controller 180 checks the trajectory of the received signal (S720). If the trajectory is repeated (S730), the pointer 202 is displayed at the center or center area of the display screen 620 (S740). Here, the repeated trajectory includes, for example, an operation of shaking the pointing device in a horizontal or vertical direction or an operation of rotating the pointing device in a circular or elliptical shape.

That is, if the pointing device 201 is moved in a predetermined pattern or to form a gesture, the image display device 100 enters into the pointer 202 reset mode and moves the pointer 202 to the center of the display of the image display device 100. When the pointing device is used for a long period of time or errors occur, the user may readjust the position of the pointer 202 and rearrange the pointing device 201 by operating the pointing device 201 in a predetermined pattern.

Further, the controller 180 may display the pointer at the center of the display screen 620 if the number of the repeated trajectory is greater than or equal to a threshold value within a predetermined time. For example, if the pointing device 201 is shaken a predetermined number of times, the pointer 202 is forcibly located at the center of the display screen 620. The repeated trajectory operation is distinguished from a general operation of reciprocally moving the pointing device 201 in order to select items on the display screen 620 by observing the number of repetitions of the predetermined pattern in connection with the time component. For example, if the number of predetermined repetition of the predetermined pattern N is received within the time T1, a command for arranging a cursor at the center of the screen is received. Therefore, it is possible to prevent this operation from being confused with the general operation of the pointing device 201.

The controller may keep the pointer 202 in the inactive state once the pointer 202 is displayed at the center of the display screen 620 (S750). Keeping the pointer 202 in the inactive state preferably means that after the pointer 202 is displayed at the center of the display screen, even when the pointing device 201 moves, the pointer 202 may not be moved for a predetermined period of time in order to ensure a time for the user to rearrange the pointing device 201 at the center of the display screen 620. Alternatively, the pointer 202 may be kept stationary from a time when the pointer 202 is located at the center of the display screen 620 to a time when the pointing device 201 does not move for a predetermined period of time, in order to ensure a time for matching the position of the pointing device 201 with the position of the pointer 202.

In this case, if a predetermined time has elapsed or if an active command is received after the user moves the pointing device 201 to the position of the pointer 202, the pointer 202 may be switched from the inactive state to the active state. The active command may be set by pushing a particular button or movement of the pointing device 201 in a specific pattern.

According to the embodiment of the present invention, it is possible to correct a positional error due to a motion of the pointing device 201 in the vicinity of the display screen, a sensor error, an operation recognition error, etc. and to increase convenience and reliability of the pointing device 201 for the user.

The method for operating the image display device 100 according to the embodiment of the present invention may include receiving a signal based on shaking or a predetermined pattern/gesture of the pointing device 201 and displaying the pointer 202 at a first position.

The controller 180 may check data associated with the position and movement of the pointing device 201 included in the signal received from the pointing device 201 and control the image display device 100 to display the pointer 202 at the fixed first position. That is, for example, in the embodiment of the present invention, the operation of shaking the pointing device 201 in a horizontal direction or another direction may correspond to a command for displaying the pointer 202 at a predetermined position.

If the user is unaware of the position of the pointer 202 or recognizes that error occurs between the movement of the pointing device 201 and the position of the pointer 202, the user may perform an operation of shaking the pointing device 201 to readily display the pointer 202 at a specific position. Therefore, the user may accurately perform a desired operation after the pointer 202 is displayed at a specific position. The operation of shaking the pointing device 201 may be a point reset command for displaying the pointer 202 at the center of the display 170 or at a specific position. In this case, the controller 180 may reset the coordinates of the pointer to correspond to the center of the display 170 or the specific position.

A general operation of moving the pointer 202 to the left and then moving the pointer 202 to the right may be detected similarly to the operation of shaking the pointing device. Therefore, the controller 180 may set the number of times of movement or a predetermined moving time of the pointer 202, in order to more accurately distinguish between the operation of shaking the pointing device 201 to reset the position of the pointer 202 and the general operation of moving the pointing device 201. For example, if the pointing device 201 reciprocally moves two times or more in the horizontal direction or if the pointing device 201 reciprocally moves within 0.5 seconds in the horizontal direction, it may be determined that the pointing device 201 is shaken to reset the display position of the pointer 202.

The first position may be the center of the display 170 or a predetermined position. For example, if the pointing device 201 is shaken in the horizontal direction or another direction, the pointer 202 is displayed at the center of the display 170. The center of the image display device 100 is at a point where a virtual line for bisecting the display in the horizontal direction and a virtual line for bisecting the display in the vertical direction intersect, as a default. However, the user may change the fixed display position of the pointer 202.

The method for operating the image display device 100 according to another embodiment of the present invention includes displaying a pointer, removing the display of the pointer if a predetermined time has elapsed or a predetermined event occurs, receiving a signal based on shaking of a pointing device from the pointing device, and re-displaying the pointer. In addition, the controller 180 may control the disappeared pointer to be re-displayed at a predetermined position if the pointing device is shaken.

The re-displaying the pointer may include re-displaying the pointer at a predetermined re-display point. For example, the pointer may be re-displayed at a previously located point. Even in this case, the re-display position of the pointer is constantly provided such that the user can be readily aware of the position of the pointer without efforts for checking the position of the pointer.

FIGS. 9A to 10D are views referred to for describing an example of a method for operating an image display device according to an embodiment of the present invention.

Figure 9A:
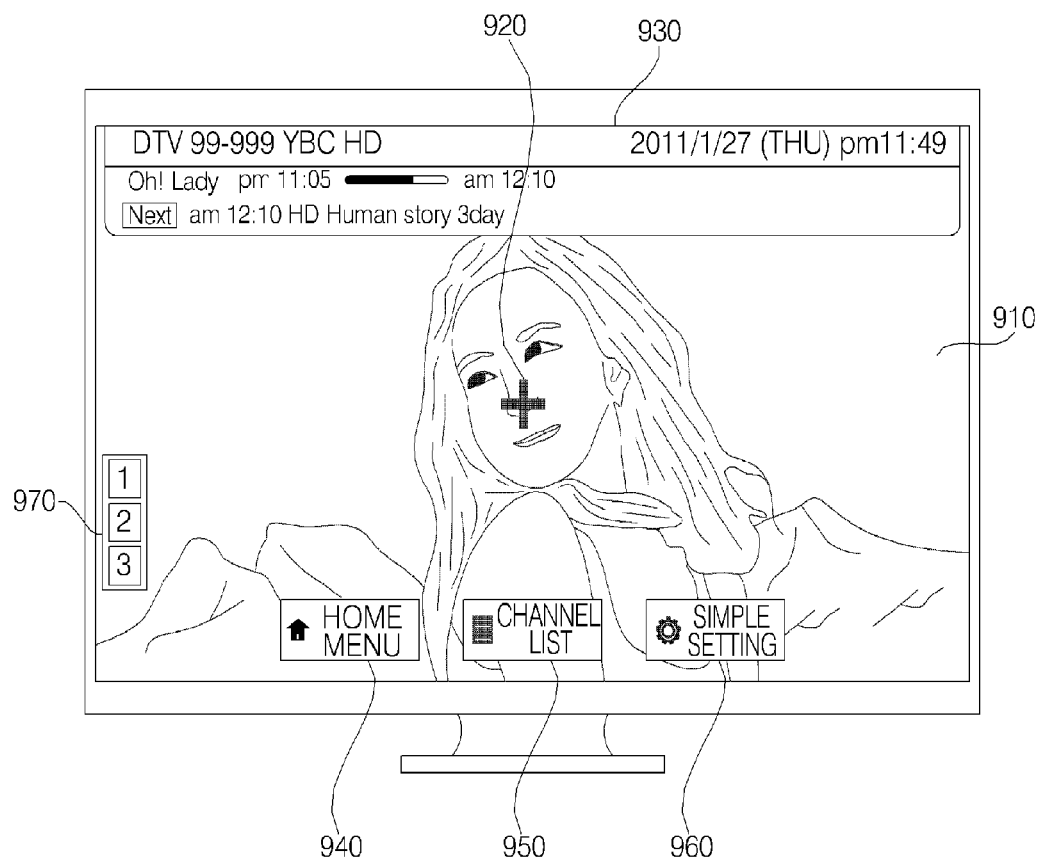
FIGS. 9A-9C are views referred to for describing an example of a method for operating an image display device according to an embodiment of the present invention.

First, a predetermined image may be displayed on the display 170. Referring to FIG. 9A, thereafter, when the user pushes a predetermined key or a first button of the pointing device 201, for example, the okay/enter/select button 291 of the pointing device 201 while viewing a content image 910 on the display 170, a pointer 920 may be displayed on the display 170. In this case, since the user generally manipulates the pointing device 201 in order to perform a predetermined function, an icon corresponding to a menu or the predetermined function may be further displayed. For example, content information 930, a home menu 940, a channel list 950, a simple setting 960, etc. may be displayed together with the content image 910.

A direct menu 970 which is displayed when the pointer 920 approaches a predetermined area may be displayed when the user pushes the okay/enter/select button 291. That is, since the direct menu 970 is displayed even when the pointer is not located in the area for displaying the direct menu 970, the user can be aware of the fact that the direct menu 970 may be displayed and selected when moving the pointer to a certain area while viewing the image.

The method for operating the image display device according to the embodiment of the present invention may further include removing the pointer from the display 170. The removing of the pointer 920 may be performed when a certain button of the pointing device 201 is pushed, when no button of the pointing device 201 is pushed for a predetermined period of time, or when the pointing device 201 is not moved for a predetermined period of time. The certain button selection may be equal to the first button selection.

Figure 9B:
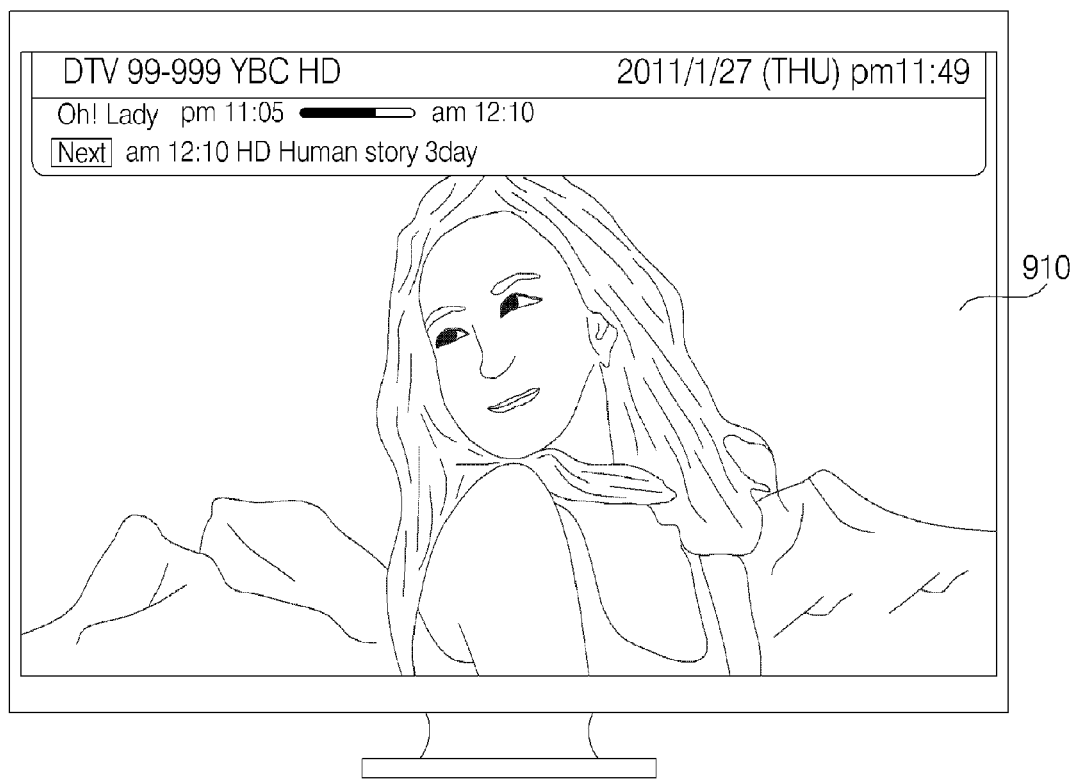

For example, if a predetermined time has elapsed without manipulation of the pointing device, as shown in FIG. 9B, the display of the pointer may be removed. In this case, the content information 930, the home menu 940, the channel list 950, the simple setting 960 and the direct menu 970 may simultaneously or sequentially disappear. Referring to FIG. 9B, the content information 930 is displayed on the display 170. Once the pointer is removed, the objects may be sequentially removed. In FIG. 9B, the content information 930 is last to be removed. The present invention is not limited thereto.

If an "exit" button selection is selected, the display of the pointer may be removed from the display 170. The "exit" button may be a button or a user input of the pointing device 201 or an icon on the display.

Thereafter, once the pointer is removed from the display 170, the pointer may be re-displayed based on at least one of the second-button selection or a particular movement of the pointing device 201. The second button selection may be equal to the first button selection.

Figure 9C:
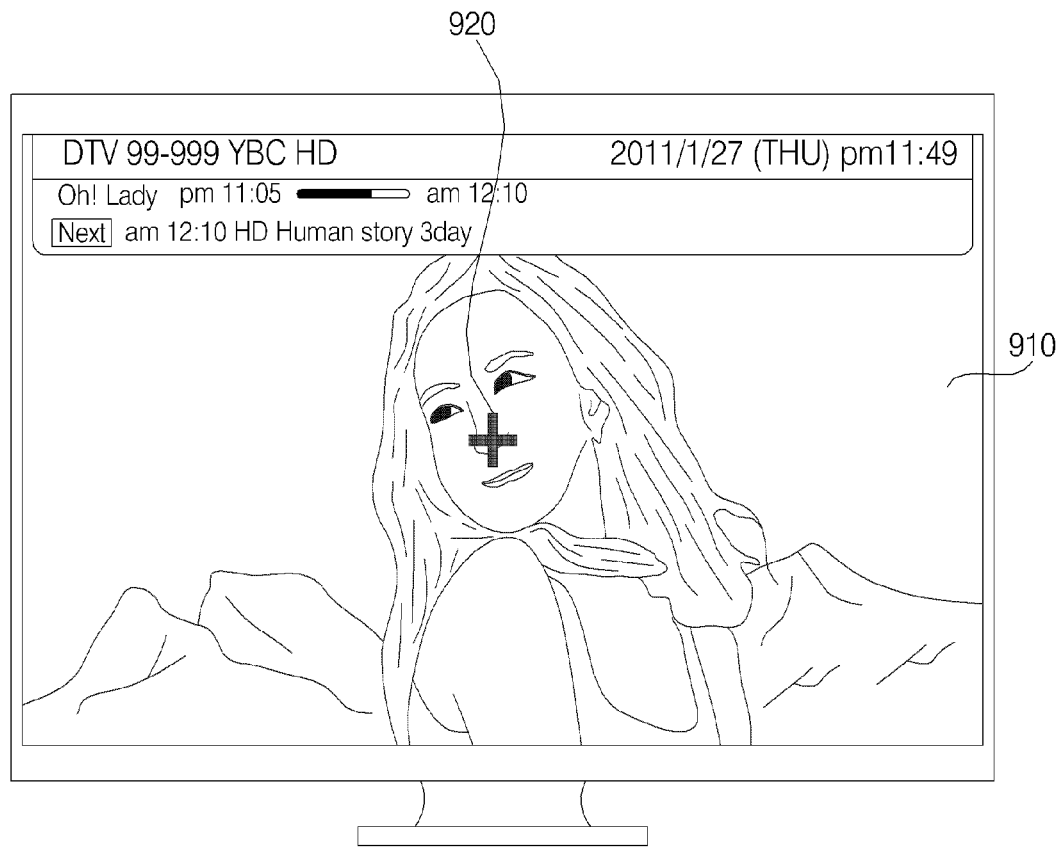
Figure 9C:
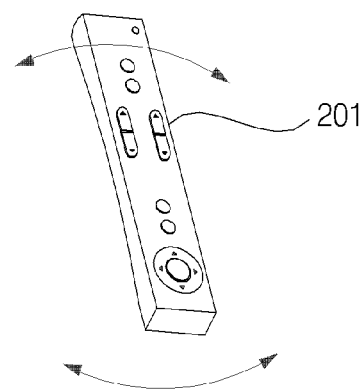

Referring to FIG. 9C, when the signal based on particular movement of the pointing device 201, for example, a shaking of the pointing device is received from the pointing device 201, the controller 180 may control the image display device to re-display the pointer. The pointer may be re-displayed at a predetermined re-display point, for example, the center of the screen or the previous display position of the pointer. That is, the pointer may be re-displayed in the central area of the display or the previous display position area of the pointer. In the embodiment of the present invention, only the pointer may be re-displayed, the pointer and the various objects shown in FIG. 9A may be re-displayed, or a specific object may be selectively displayed as shown in FIG. 9C.

Figure 10A:
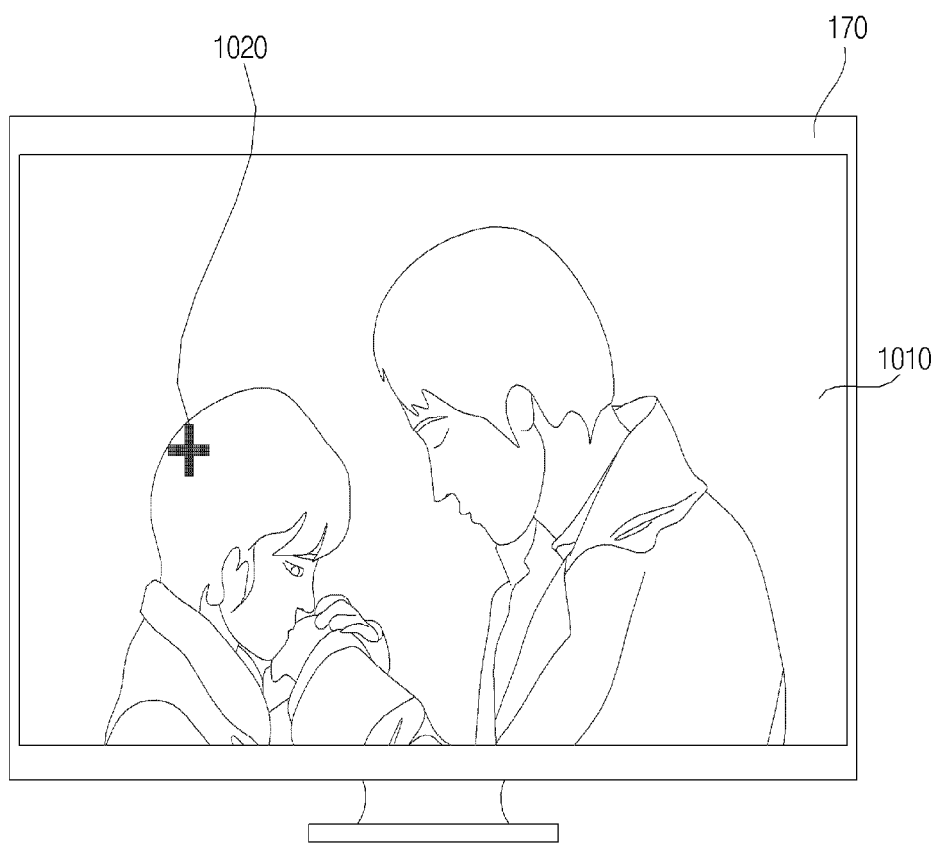
FIGS. 10A-10D are views referred to for describing an example of a method for operating an image display device according to an embodiment of the present invention.
Figure 10B:
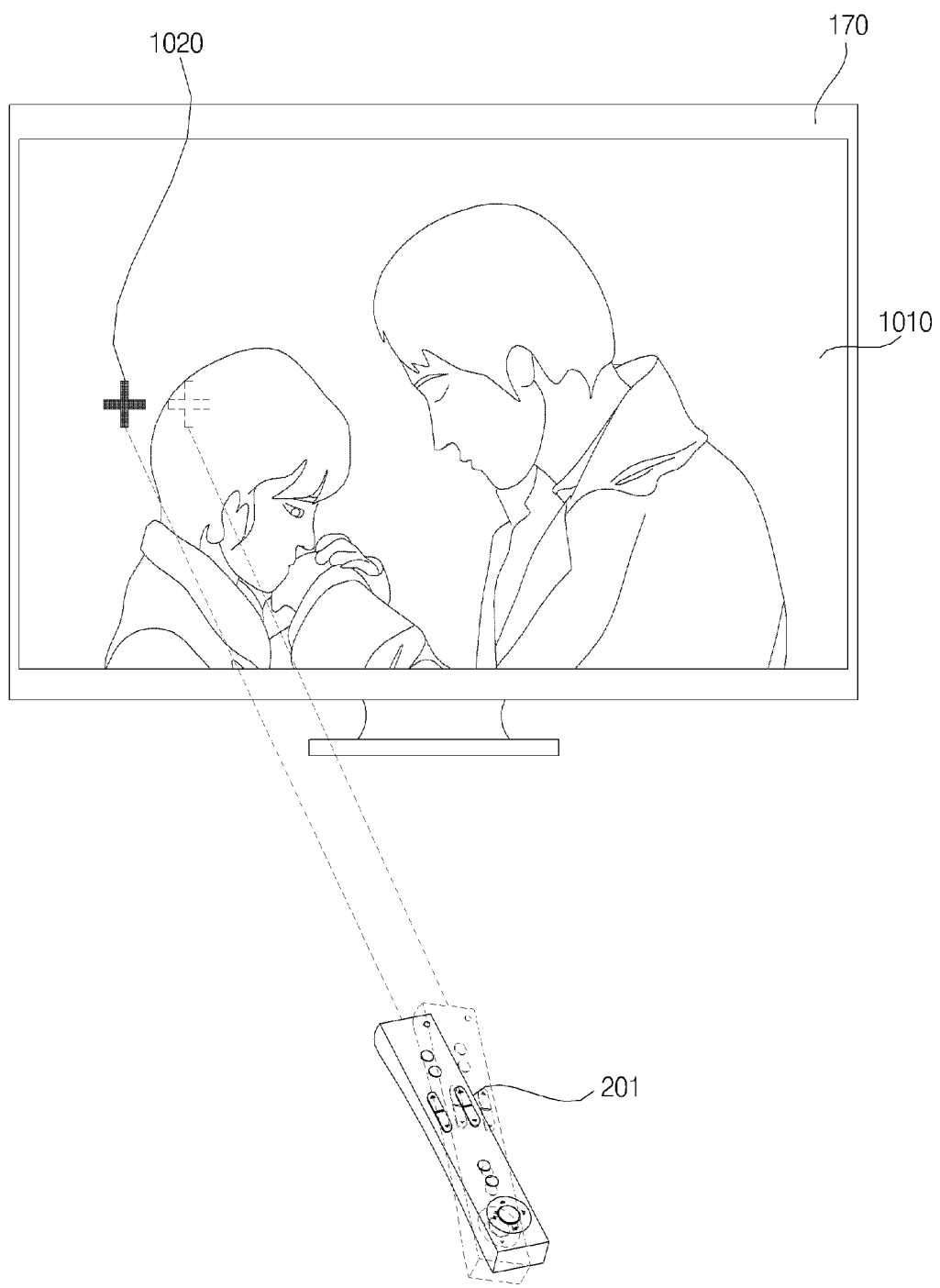

Referring to FIGS. 10A and B, when an image 1010 and a pointer 1020 are displayed on the display 170, the pointer 1020 is moved in a predetermined direction in relation to the direction in which the pointing device 201 is moved. However, the pointing device 201 may be moved so that a difference between the pointing position of the pointing device 201 and the position of the pointer 1020 is significant.

In this instance, if the user is unable to locate the position of the pointer 1020 or recognizes that an error occurs between the movement of the pointing device 201 and the position of the pointer, the user may perform a predetermined operation, such as shaking the pointing device 201 as described previously to readily display the pointer 1020 at a specific position. Here, when the operation of shaking the pointing device 201 is performed, the controller 180 may control the image display device 100 to display the pointer 1020 at a first position. The first position may be the central area of the display or the previous display position of the pointer.

That is, the method for operating the image display device according to the embodiment of the present invention may include displaying an image and displaying a pointer in a particular area of a display based on at least one of a particular button selection or a particular movement of a pointing device. The particular area may be the central area of the display or the previous display position of the pointer.

Figure 10C:
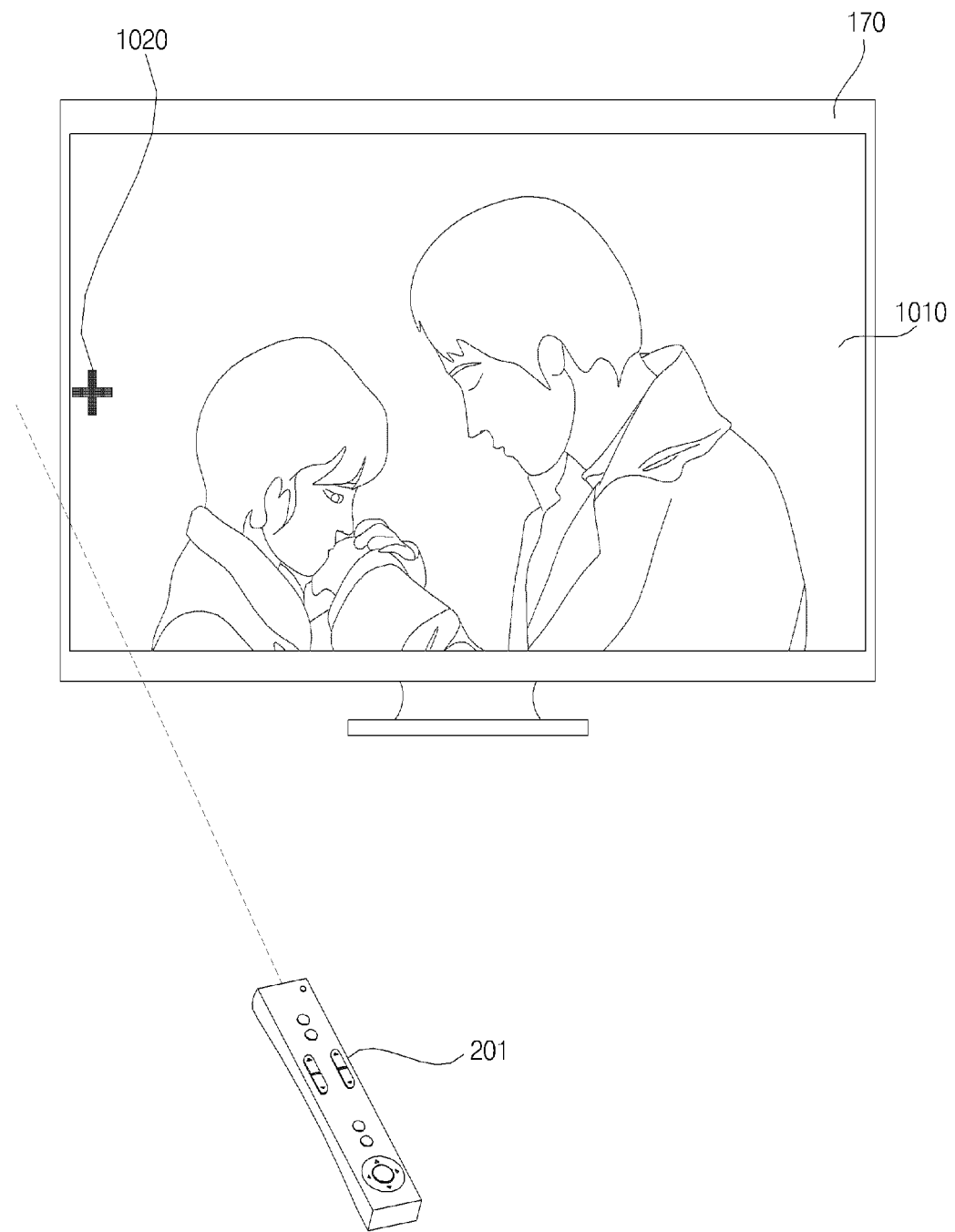

Referring to FIG. 10C, when the user moves the pointing device 201 outside the coordinates of the display 170, the pointer 1020 stays at the edge portion of the display 170 closest to the coordinates of the pointing device 201.

Figure 10D:
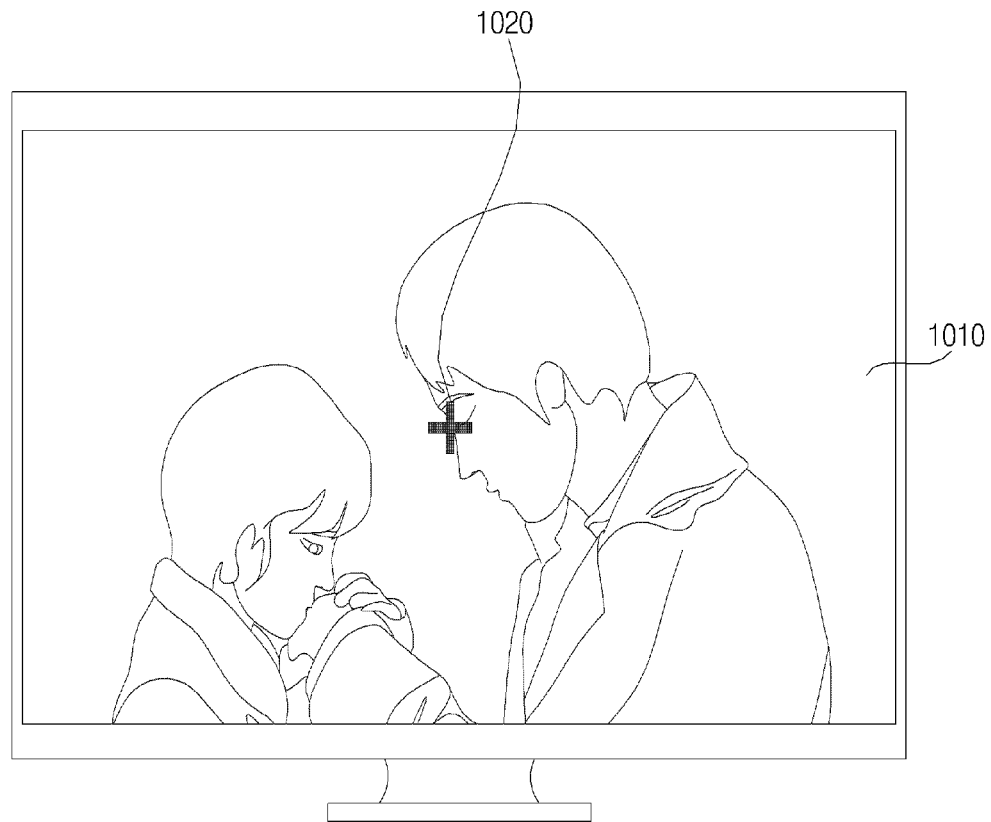
Figure 10D:
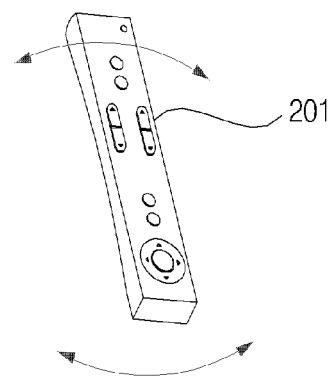

Referring to FIG. 10D, when the user shakes the pointing device 201, the pointer 1020 is displayed at a first position, for example, at the center of the display 170.

Although the operation of shaking the pointing device is described as an example of displaying the pointer at a predetermined position with reference to FIGS. 9 to 10, the present invention is not limited to the operation of shaking the pointing device. Any operation of moving the pointing device in a specific pattern, for example, an operation of moving the pointing device in a circular shape may be performed as an example of displaying the pointer at a predetermined position.

Figure 11A:
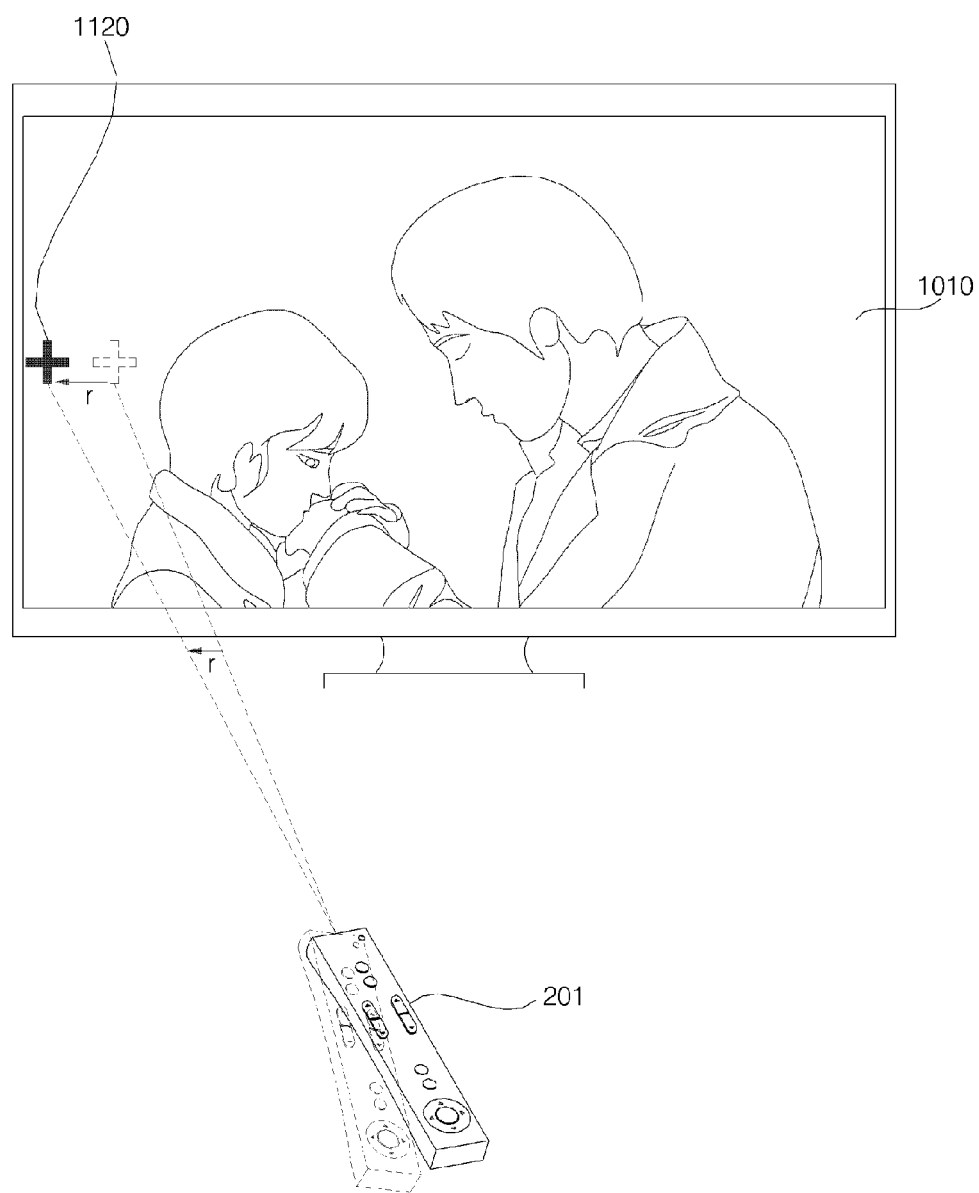
FIGS. 11A-11B are views referred to for describing an example of a method for operating an image display device according to an embodiment of the present invention.
Figure 11B:
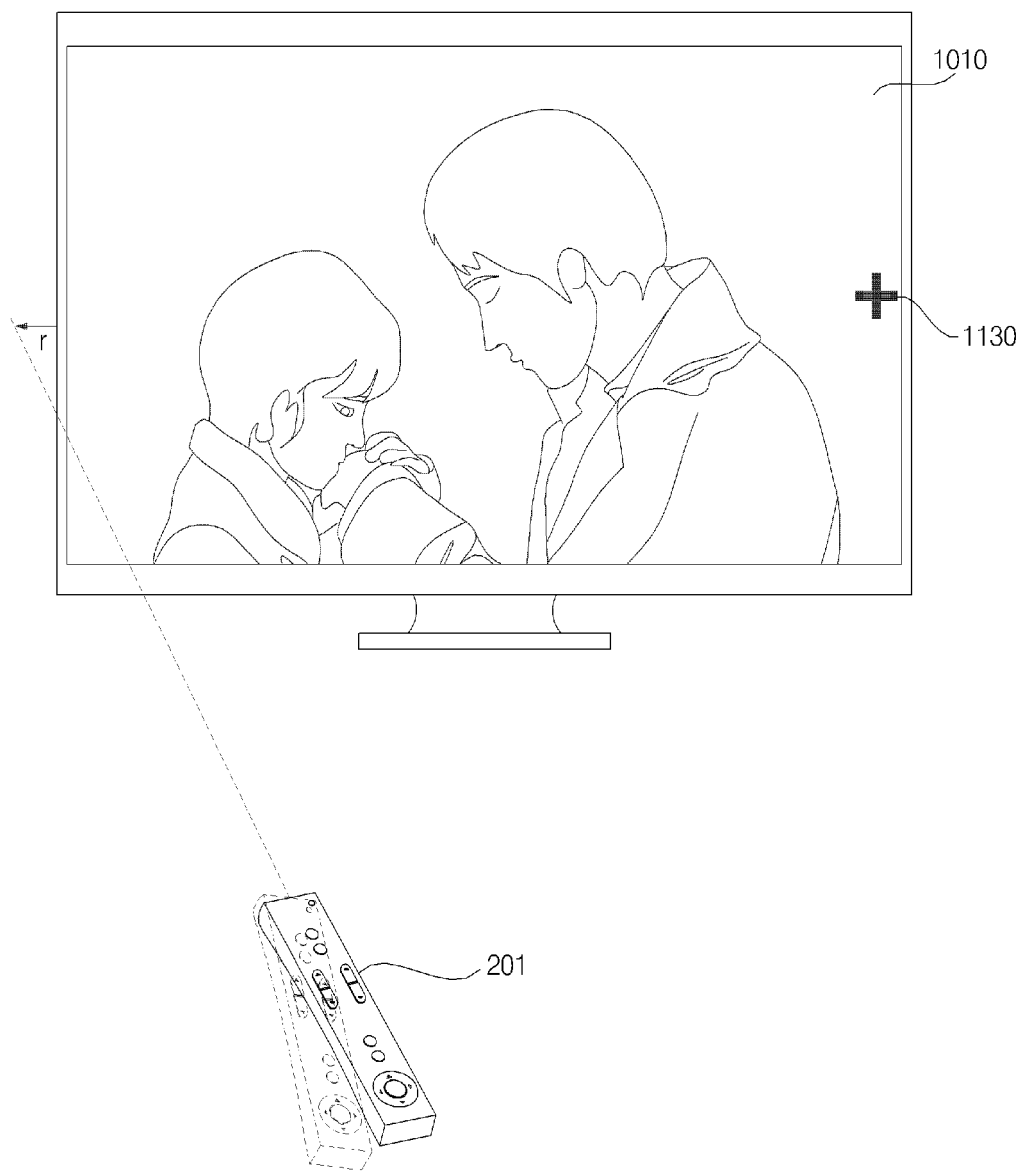

FIGS. 11A and 11B are views referred to for an example of describing a method for operating an image display device according to an embodiment of the present invention. The method for operating the image display device according to the embodiment of the present invention may further include displaying the pointer at a first edge of the display in correspondence with movement of the pointing device in a first direction and moving and displaying the pointer to and at a second edge of the display in movement of the pointing device in the first direction. The first edge and the second edge may be symmetrical with respect to the center of the display.

First, as shown in FIG. 11A, when the user moves the pointing device 201 to the left, the image display device displays the pointer 1120 on the left edge of the display 170 in correspondence with movement of the pointing device 201 in a first direction r. Thereafter, as shown in FIG. 11B, when the user further moves the pointing device 201 to the left, the image display device 100 displays the pointer 1130 on the right edge of the display 170 in correspondence with movement of the pointing device 201 in the first direction 'r'.

That is, in the embodiment of the present invention, even in the case where the user moves the pointing device in one direction such that the pointer reaches one of upper, lower, left and right edges of the display, if the pointing device continuously moves in the same direction, the pointer may be set to be displayed at the opposite edge of the display.

Thereafter, even when the pointing device continuously moves in the same direction, since the pointer is already moved and displayed to and at the opposite edge of the display, the pointer may move in correspondence with the movement direction.

Even in this case, if a difference between the pointing position of the pointing device 201 and the position of the pointer is significantly large, the user may move the pointing device in a specific pattern or push a particular button so as to display the pointer at a specific position.

According to the embodiments of the present invention, it is possible to more accurately and conveniently use the pointing device by displaying the pointer at a specific position by only a simple operation.

Although a graphic object having an arrow or cross shape is shown in the figures, the present invention is not limited thereto, other cursors, images, icons, etc. may be used.

According to the present invention, it is possible to correct positional errors due to a motion of the pointing device in the vicinity of the display screen, a sensor error, an operation recognition error, etc. and to increase user convenience and reliability of the pointing device.

The present invention may be implemented as code that can be written to a computer-readable recording medium and can thus be read by a processor included in an image display device. The computer-readable recording medium may be any type of recording device in which data can be stored in a computer-readable manner. Examples of the computer-readable recording medium include a ROM, a RAM, a CD-ROM, a magnetic tape, a floppy disc, an optical data storage, and a carrier wave (e.g., data transmission over the Internet). The computer-readable recording medium can be distributed over a plurality of computer systems connected to a network so that computer-readable code is written thereto and executed therefrom in a decentralized manner. Functional programs, code, and code segments needed for realizing the embodiments herein can be construed by one of ordinary skill in the art.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for operating an image display device using a pointing device, the method comprising:
    receiving, from the pointing device, a signal to display a pointer on a display;
    outputting, on the display, an image;
    outputting, together with the displayed image, the pointer in a particular area of the display in response to the signal to display the pointer based on at least one of a particular input selection or a particular movement of the pointing device;
    moving the pointer to a pre-designated area of the display to display the pointer at the pre-designated area corresponding to a repetitive movement of the pointing device in a predetermined pattern;
    keeping the pointer in an inactive state once the pointer is displayed at the pre-designated area of the display; and
    switching a state of the pointer from the inactive state to the active state when a predetermined time has elapsed or when an active command is received after the pointing device is moved to the pre-designated area of the display.

2. The method according to claim 1, wherein the pre-designated area is a central area of the display or a previous display area of the pointer.

3. The method according to claim 1, further comprising:
    moving the pointer to a first side of the display in correspondence with a movement of the pointing device in a particular direction;
    outputting the pointer at the first side of the display in correspondence with the movement of the pointing device in the particular direction; and
    moving and outputting the pointer to and at a second side of the display when the movement of the pointing device in the particular direction is continued.

4. The method according to claim 3, wherein the first side and the second side of the display are symmetrical with respect to a center of the display.

5. The method according to claim 1, wherein the repetitive movement includes an operation of shaking of the pointing device in a horizontal or vertical direction or an operation of rotating the pointing device in a circular shape.

6. An image display device using a pointing device, comprising:
    a display configured to display an image and a pointer;
    an interface configured to receive a signal from the pointing device to display and move the pointer; and
    a controller configured to control the pointer to be displayed in a particular area of the display based on at least one of a particular input selection or a particular movement of the pointing device, and to move the pointer to a pre-designated area of the display to display the pointer at the pre-designated area corresponding to a repetitive movement of the pointing device in a predetermined pattern,
    wherein the controller keeps the pointer in an inactive state once the pointer is displayed at the pre-designated area of the display, and switches a state of the pointer from the inactive state to the active state.

7. The image display device according to claim 6, wherein the pre-designated area is a central area of the display or a previous display area of the pointer.

8. The image display device according to claim 6, wherein the controller moves the pointer to a first side of the display in correspondence with the movement of the pointing device in a particular direction, displays the pointer at the first side of the display in correspondence with the movement of the pointing device in the particular direction, and moves the pointer to and displays the pointer at a second side of the display in when the movement of the pointing device in the particular direction is continued.

9. The image display device according to claim 8, wherein the first side and the second side of the display are symmetrical with respect to the center of the display.

10. The image display device according to claim 6, wherein the repetitive movement includes an operation of shaking of the pointing device in a horizontal or vertical direction or an operation of rotating the pointing device in a circular shape.

* * * * *